United States Patent
Kiser et al.

(10) Patent No.: US 6,947,020 B2
(45) Date of Patent: Sep. 20, 2005

(54) MULTI-ARRAY SPATIAL LIGHT MODULATING DEVICES AND METHODS OF FABRICATION

(75) Inventors: David K. Kiser, Sherwood, OR (US); Melvin Francis, Tigard, OR (US)

(73) Assignee: OregonLabs, LLC, Sherwood, OR (US)

( * ) Notice: Subject to any disclaimer, the term of this patent is extended or adjusted under 35 U.S.C. 154(b) by 84 days.

(21) Appl. No.: 10/316,395

(22) Filed: Dec. 10, 2002

(65) Prior Publication Data

US 2003/0228154 A1 Dec. 11, 2003

Related U.S. Application Data

(60) Provisional application No. 60/383,162, filed on May 23, 2002.

(51) Int. Cl.$^7$ .............................. G09G 3/20; G09G 3/36; G09G 5/00; G02B 26/00; B41J 2/47
(52) U.S. Cl. .......................... 345/87; 345/55; 345/205; 359/237; 359/290; 347/239
(58) Field of Search ................................. 359/237, 290, 359/291, 292, 253, 248; 347/234, 237, 232, 238, 247, 255, 239, 135, 136; 345/55, 82–84, 87–103, 205

(56) References Cited

U.S. PATENT DOCUMENTS

| | | |
|---|---|---|
| 4,864,390 A | 9/1989 | McKechnie et al. |
| 5,185,712 A | 2/1993 | Sato et al. |
| 5,278,595 A | 1/1994 | Nishida et al. |
| 5,313,479 A | 5/1994 | Florence |
| 5,321,448 A | 6/1994 | Ogawa |
| 5,398,081 A | 3/1995 | Jones |
| 5,767,924 A | 6/1998 | Hiroki et al. |
| 5,892,623 A | 4/1999 | Bradley |
| 5,895,109 A | 4/1999 | Yamaguchi et al. |
| 6,005,645 A | 12/1999 | Hirakata et al. |
| 6,014,193 A | 1/2000 | Taira et al. |
| 6,082,862 A | 7/2000 | Popovich |
| 6,082,863 A | 7/2000 | Jones et al. |
| 6,219,110 B1 | 4/2001 | Ishikawa et al. |
| 6,232,936 B1 | 5/2001 | Gove et al. |
| 6,263,123 B1 | 7/2001 | Bishop et al. |
| 6,334,685 B1 | 1/2002 | Slobodin |
| 6,406,148 B1 | 6/2002 | Marshall et al. |
| 6,431,709 B1 | 8/2002 | Tiao et al. |
| 6,628,317 B2 * | 9/2003 | Enomoto et al. ............ 347/234 |
| 2001/0048406 A1 | 12/2001 | Masumoto et al. |

FOREIGN PATENT DOCUMENTS

| | | |
|---|---|---|
| EP | 0325361 A2 | 7/1989 |
| EP | 0547601 A2 | 6/1993 |

* cited by examiner

*Primary Examiner*—Georgia Epps
*Assistant Examiner*—Jack Dinh
(74) *Attorney, Agent, or Firm*—Blakely, Sokoloff, Taylor & Zafman, LLP

(57) ABSTRACT

A multi-array spatial light modulating (SLM) device and methods of fabricating such a device. The multi-array SLM device includes a number of addressable arrays of elements, and each of the addressable arrays is capable of modulating light to generate an image.

38 Claims, 30 Drawing Sheets

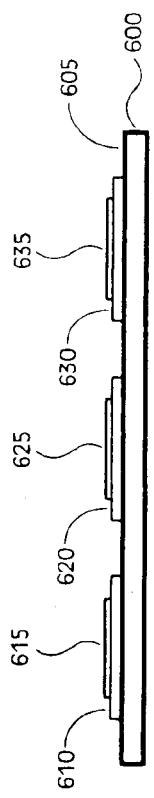
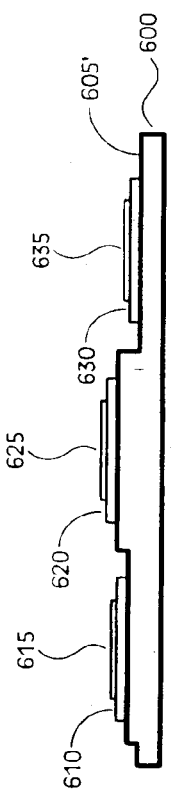
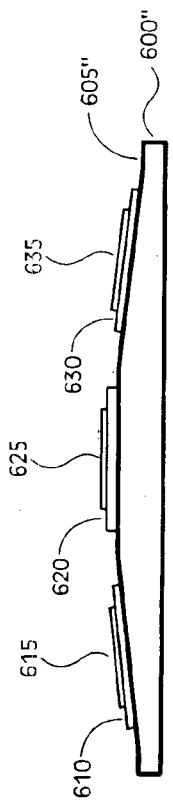
FIG. 6B
FIG. 6C
FIG. 6D

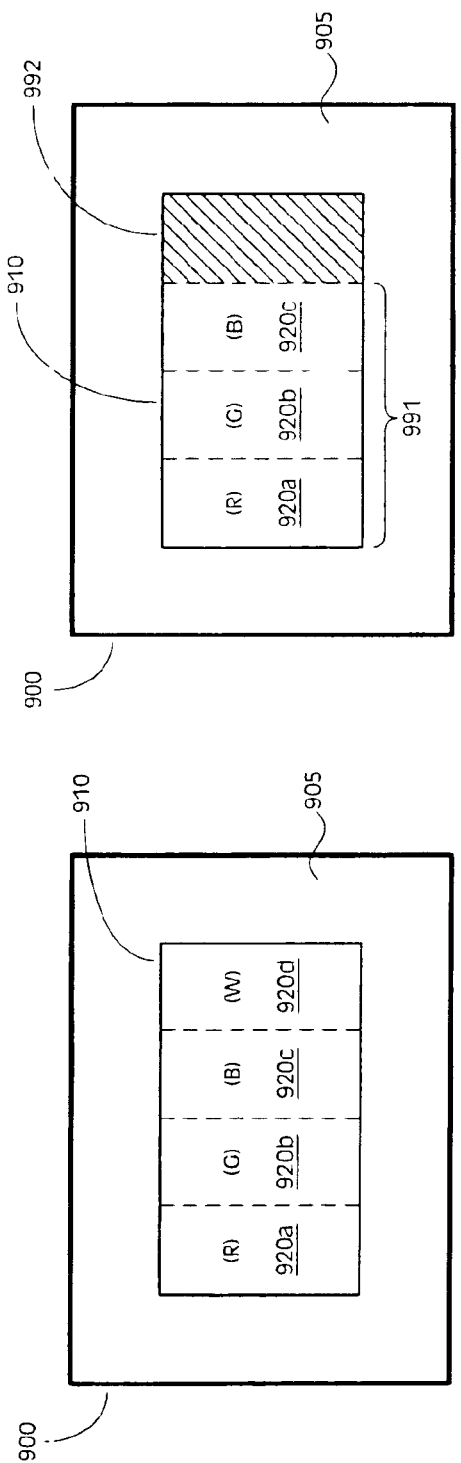
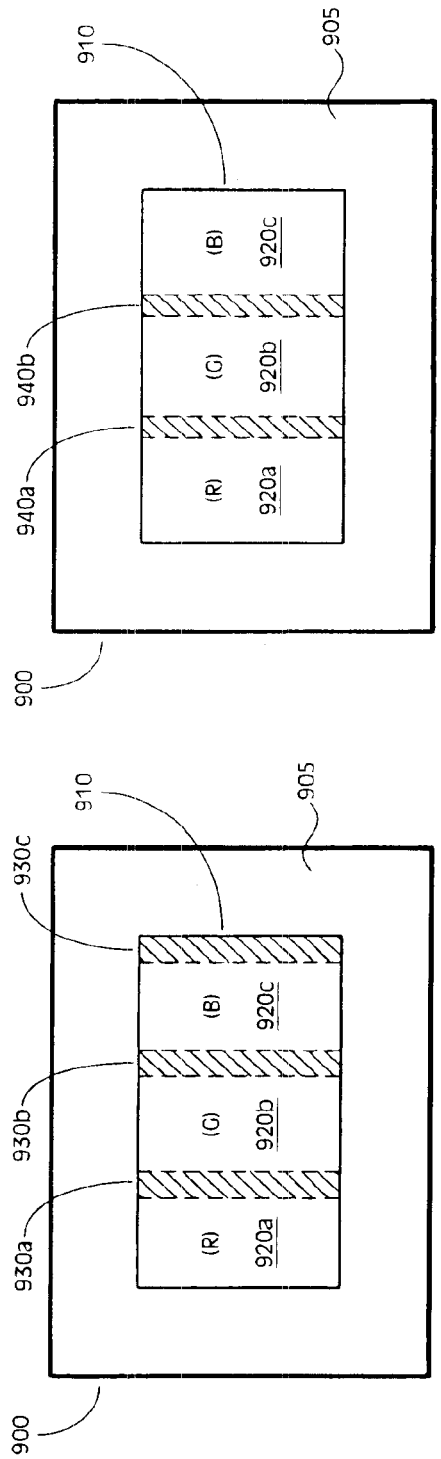

MULTI-ARRAY SPATIAL LIGHT MODULATING DEVICES AND METHODS OF FABRICATION

CLAIM OF PRIORITY

This application claims the benefit U.S. provisional application No. 60/383,162, entitled "Miniature Projector Employing Beam Steering and Dedicated Segmentation of Spatial Light Modulator," filed on May 23, 2002.

RELATED APPLICATIONS

This application is related to application Ser. No. 10/316,631, entitled "Optics Engine Having Multi-Array Spatial Light Modulating Device and Method of Operation," application Ser. No. 10/316,609, entitled "Apparatus for Generating a Number of Color Light Components," and application Ser. No. 10/316,789, entitled "Apparatus for Combining a Number of Images Into a Single Image" all filed on even date herewith.

FIELD OF THE INVENTION

The invention relates generally to televisions, computer displays, data projectors, cinema projectors, and the like. More particularly, the invention relates to a multi-array spatial light modulating devices and methods of fabricating such devices.

BACKGROUND OF THE INVENTION

A spatial light modulating (SLM) device generally comprises an addressable array of pixels. Each pixel of the addressable array is separately addressable and, using the addressable array, the SLM device can modulate incoming light pixel by pixel to produce an image. The image may then be provided—typically through a series of projection optics—to a screen or other display for viewing. Conventional SLM devices include both transmissive and reflective liquid crystal displays (LCDs), liquid crystal on silicon (LCOS) devices, emissive displays, as well as micromirror devices such as the Digital Micromirror Device™ (or DMD™). Digital Micromirror Device™ and DMD™ are both registered trademarks of Texas Instruments Inc. These conventional SLM devices are also commonly referred to as "light valves."

An LCD comprises an addressable array of liquid crystal elements fabricated on a substrate, this substrate comprising glass, quartz, or a combination of materials (e.g., glass with a polysilicon layer deposited thereon). Each liquid crystal element of the addressable array corresponds to a pixel, and each element is switchable between a state wherein light is blocked and another state wherein light is transmitted or reflected. Gray scaling is provided by the modulation scheme employed.

An LCOS device comprises an addressable array of liquid crystal elements fabricated directly on a wafer or substrate comprised of a silicon material or other semiconductor (similar to those used in manufacturing memory chips and processors). The manufacturing techniques employed to construct LCOS devices are similar to those utilized in the fabrication of integrated circuits (ICs). By forming the addressable array directly on the semiconductor substrate using IC manufacturing processes, very small feature sizes (and, hence, pixel size) may be obtained, and the driver circuitry for each pixel can be fabricated directly on the chip along with the addressable array. Again, gray scaling is provided by the modulation scheme employed.

Emissive devices include, by way of example, organic light emitting diodes (or OLEDs) and polymer light emitting diodes (or PLEDs). OLED and PLED devices are similar to their semiconductor-based predecessors—i.e., the light emitting diode or LED—however, rather than using traditional semiconductor materials, OLED and PLED devices have a multi-layer structure comprised of an organic or polymer material. An OLED or PLED device includes an addressable array of light emitting diode elements, each diode element corresponding to a pixel. Each diode element of the addressable array is switchable between an off state and an on state wherein light is emitted. Other examples of an emissive device include electroluminescent (EL) displays, plasma display panels (PDPs), field emission devices (FEDs), and vacuum fluorescent displays (VFDs).

A micromirror device (e.g., a DMD™) is a MEMS (microelectromechanical systems) device comprising an addressable array of mirrors, each mirror representing a single pixel. Each mirror can be switched between a first state, wherein the mirror is at one angular orientation, and a second state, wherein the mirror is at a different angular orientation. At the first state, the angular orientation of the mirror provides a dark pixel, and at the second state, the angular orientation of the mirror is such that light is reflected towards a projection lens and/or display. Gray scale is provided by varying the amount of time a mirror is switched to the second state. Because the mirrors in the addressable array of a micromirror device are each switchable between a first state (off) and a second state (on), a micromirror device is a true digital imaging device.

The addressable array of a conventional SLM device is typically sized to provide an image exhibiting an aspect ratio corresponding to a known standard, such as High Definition Television (HDTV), Extended Graphics Array (XGA), Super Video Graphics Array (SVGA), Super Extended Graphics Array (SXGA), Ultra Extended Graphics Array (UXGA), or Quantum Extended Graphics Array (QXGA). For example, the addressable array of elements (e.g., liquid crystal elements, diode elements, micromirrors, etc.) may include an array of 1,280 by 720 elements or pixels providing a 16:9 aspect ratio (e.g., for HDTV-720p applications), an array of 1,920 by 1,080 elements also providing a 16:9 aspect ratio (e.g., for HDTV-1080i applications), an array of 800 by 600 elements providing a 4:3 aspect ratio (e.g., for SVGA applications), an array of 1,024 by 768 elements providing a 4:3 aspect ratio (e.g., for XGA applications), an array 1,600 by 1,200 elements providing a 4:3 aspect ratio (e.g., for UXGA applications), an array of 2,048 by 1,536 elements also providing a 4:3 aspect ratio (e.g., for QXGA applications), or an array of 1,280 by 1,024 elements providing a 5:4 aspect ratio (e.g., for SXGA applications).

To produce color images for television, data projectors, and other video applications, a practice known as field sequential color modulation is commonly employed. In field sequential color modulation, three primary colors of light are rapidly sequenced across an SLM device's addressable array of elements. The three primary colors are typically red, green, and blue, although a fourth color (i.e., "white" light) may be added to provide increased brightness and image quality. A color wheel or other sequential color device (e.g., a solid state color filter) is generally utilized to sequence the three (or four) colors of light. The SLM device modulates or switches the addressable array in synchronization with the color sequencing to produce images of the three primary colors, each of these images then being transmitted (typically through a series of projection optics) to a projection screen or other display for viewing. The three color images are sequentially displayed at a sufficiently fast rate to enable the viewer to "see" the images as a single, full-color image.

Optics engines utilizing field sequential color do, however, suffer from a number of disadvantages. These systems often provide low optical efficiency. Further, a phenomena known as the "rainbow effect" or "color break-up" may result from the field sequential coloring. Color break-up may occur where, for example, you have white objects on a black background (or black objects on a white background). If the white (or black) objects are moving—or a viewer shifts focus from one side of the screen to the other—the viewer may see the images break up into their colored components and, when this occurs, the viewer may actually perceive separate red, green, and blue color images. The rainbow effect may be caused by a number of factors, including an insufficient frame rate, an insufficient switching rate between colors, as well as the ordering of colors, and this phenomena may even occur with color images.

As an alternative to field sequential color systems, multiple SLM devices may be employed in an optics engine to produce full color images. In such a multiple SLM device system, light emitted from a lamp or other source is separated into three primary colors (again, typically red, green, and blue), and each primary color of light is directed toward a separate SLM device. Each of the separate SLM devices modulates its corresponding color of incoming light pixel by pixel to create an image of that color. The multiple color images (e.g., red, green, and blue) are then combined to form a single image that is output (usually through a series of projection optics) to a projection screen or other display for viewing. Because these systems typically utilize a separate SLM device for each of red, green, and blue light, such systems are commonly referred to as "three-chip" systems. Systems employing two chips (i.e., "two-chip" systems) are also known. Such two-chip systems illuminate one chip exclusively with one color (e.g., red) and use field sequential coloring to alternately illuminate the second chip with two other colors (e.g., blue and green).

Although three-chip systems generally provide higher color quality than their counterpart field sequential color systems and do not suffer from the rainbow effect, such multi-SLM device systems do have their disadvantages. More specifically, the light paths in these three-chip optics engines are very complex, thereby increasing the overall system complexity and size. Also, because of this complexity, conventional three-chip SLM device systems are higher in cost. Note that two-chip systems may suffer from the same disadvantages as both the field sequential color systems and the three-chip systems.

SUMMARY OF THE INVENTION

In one embodiment, a multi-array device comprises a number of addressable arrays of elements disposed on a substrate. Each of the number of addressable arrays of elements can modulate light. The multi-array device also includes a plurality of buffer regions, wherein each of the buffer regions is disposed between neighboring addressable arrays.

In another embodiment, a multi-array device comprises a substrate having a first device, a second device, and a third device disposed thereon. Each of the first, second, and third devices includes and addressable array of elements. The addressable array of elements of each device can modulate light.

In a further embodiment, a multi-array device comprises an addressable array of elements disposed on a substrate. The addressable array of elements is segmented into a number of subarrays, wherein each of the subarrays can modulate light to generate an image. Each of the images generated by the subarrays has an aspect ratio, and these images can be combined to form a single image that has this aspect ratio. An embodiment of a method of segmenting a multi-array device is also disclosed.

In yet another embodiment, a multi-array device comprises a substrate, a first device disposed on the substrate, and a second device disposed on the substrate. The first device includes an addressable array of elements that can modulate light. The second device has a number of addressable arrays of elements, wherein each of the addressable arrays of the second device can modulate light. The second device also includes a plurality of buffer regions, each of the buffer regions being disposed between neighboring addressable arrays of the second device.

In yet a further embodiment, a multi-array device comprises a substrate, a first device disposed on the substrate, and a second device disposed on the substrate. The first device has an addressable array of elements capable of modulating light and generating an image that has an aspect ratio. The second device also includes an addressable array of elements. The addressable array of the second device is segmented into a number of subarrays, and each of the subarrays can modulate light to generate an image having the aspect ratio. The image produced by the first device and the images created by the subarrays of the second device can be combined to form a single image that has this aspect ratio.

The disclosed embodiments also encompass methods of fabricating a multi-array device. In one embodiment, a number of addressable arrays of elements are formed on a substrate. Each of the addressable arrays of elements can modulate light. A plurality of buffer regions are also provided, wherein each buffer region is disposed between neighboring addressable arrays.

In another embodiment, a first device, a second device, and a third device are attached to a substrate. Each of the first, second, and third devices includes an addressable array of elements. The addressable array of elements of each device can modulate light.

In a further embodiment, an addressable array of elements is formed on a substrate. The addressable array of elements is sized such that the addressable array can be divided into a number of subarrays, each of the subarrays being capable of modulating light to generate an image. Each of the images generated by the subarrays has a specified aspect ratio, and these images can be combined to form a single image that has the specified aspect ratio.

BRIEF DESCRIPTION OF THE DRAWINGS

FIGS. 6A–D are schematic diagrams, each illustrating yet another embodiment of a multi-array SLM device.

FIGS. 9A–9E are schematic diagrams, each illustrating a further embodiment multi-array SLM device.

DETAILED DESCRIPTION OF THE INVENTION

Figure 1:
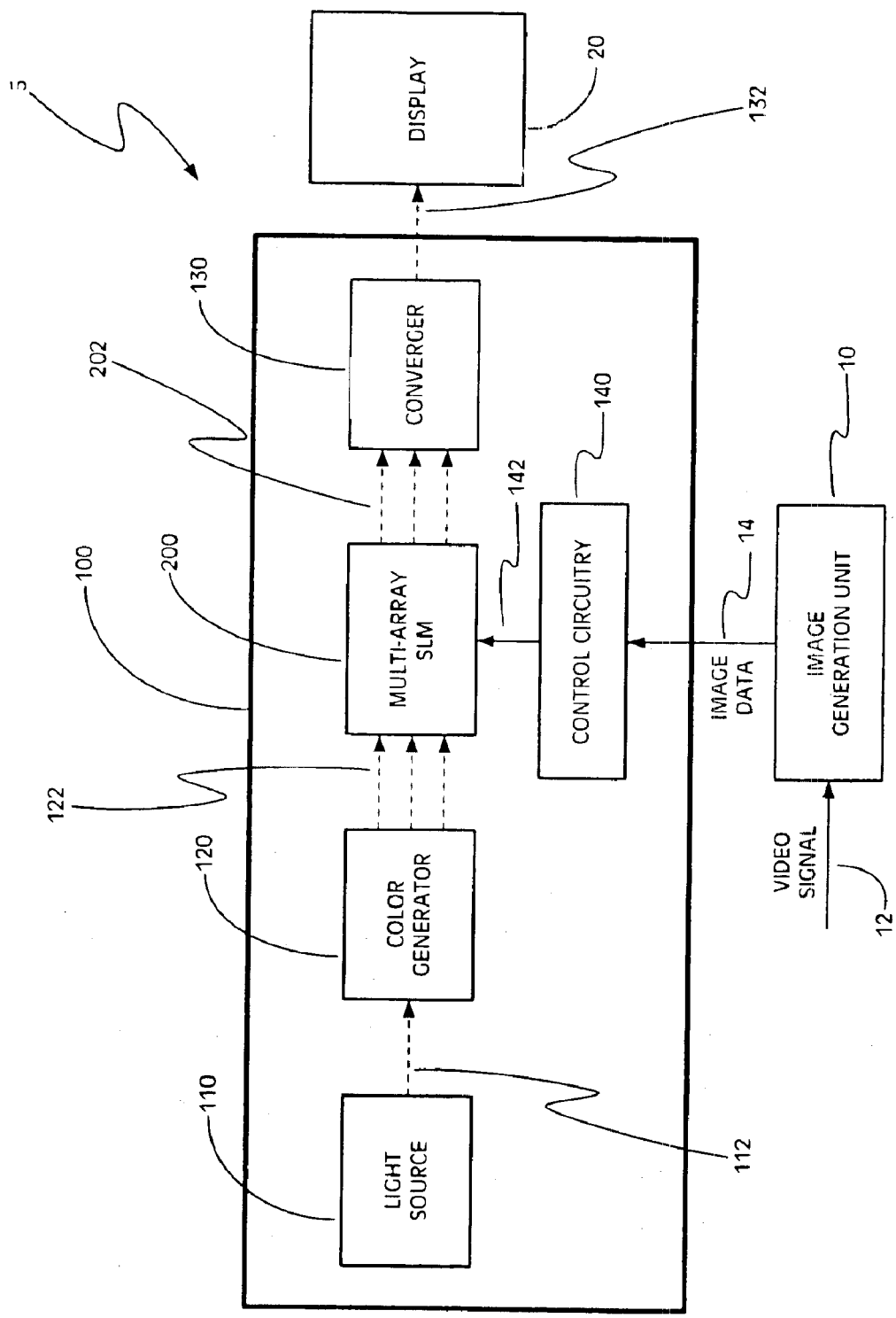
FIG. 1 is a block diagram illustrating an embodiment of a system including a multi-array SLM device.

Referring to FIG. 1, illustrated is an embodiment of a system 5 for generating video images from a video signal. The system 5 includes an optics engine 100, an image generation unit 10, and a display 20. Optics engine 100 includes a light source 110, a color generator 120, a multi-array SLM device 200, a converger 130, as well as control circuitry 140. The system 5 may comprise, by way of example only, a rear projection television, a computer monitor, a front projection television, a cinema projector, or a data projector (the latter two also typically employing front projection).

The image generation unit 10 receives a video signal (or signals) 12 and processes the received video signal 12 to generate image data 14, the image data 14 being provided to the optics engine 100. Image generation unit 10 may comprise any suitable processing device (or devices)—including a microprocessor, a DSP (digital signal processor), an ASIC (application specific integrated circuit), as well as others—and associated circuitry (e.g., memory). The optics engine 100 uses the image data 14 to produce an image or sequence of images 132 that are directed to the display 20 for viewing. The display 20 may comprise a rear projection display, a front projection screen, or any other suitable display device.

The light source 110, which may comprise any suitable lamp, bulb, or other luminescent source, provides "white" light or other polychromatic light 112 for the optics engine 100. The color generator 120 comprises any device that can receive the light 112 provided by light source 110 and output a number of color components 122. In one embodiment, the color generator 120 outputs the primary colors red, green, and blue. In another embodiment, the color generator 120 outputs red, green, blue, and white light components. It should be understood, however, that the color generator 120 may output any suitable number and colors of light components. For ease of understanding, and without limitation, the disclosed embodiments are generally described in the context of red, green, and blue light components. Also, as will be explained in more detail below, the color generator 120 and light source 110 are not needed for an embodiment of the optics engine 100 wherein the multi-array SLM device 200 comprises an emissive device.

The multi-array SLM device 200 includes a number of addressable arrays of elements, each element of an addressable array generally corresponding to a pixel. Multi-array SLM device 200 receives each of the color components 122 provided by the color generator 120, and one addressable array of SLM device 200 modulates each of the color components 122 pixel-by-pixel to create an image 202 of that color. In one embodiment, the multi-array SLM device 200 includes three addressable arrays, each addressable array receiving one of three color components 122 (e.g., red, green, and blue) and modulating the light to create an image 202. The three color images 202 (e.g., red, green, and blue) are then provided to the converger 130. In another embodiment, the multi-array SLM device 200 includes four addressable arrays, each addressable array receiving one of four color components (e.g., red, green, blue, and white) and modulating the light to create an image in that color. The multi-array SLM device 200 may include any other suitable number of addressable arrays.

Figure 2:
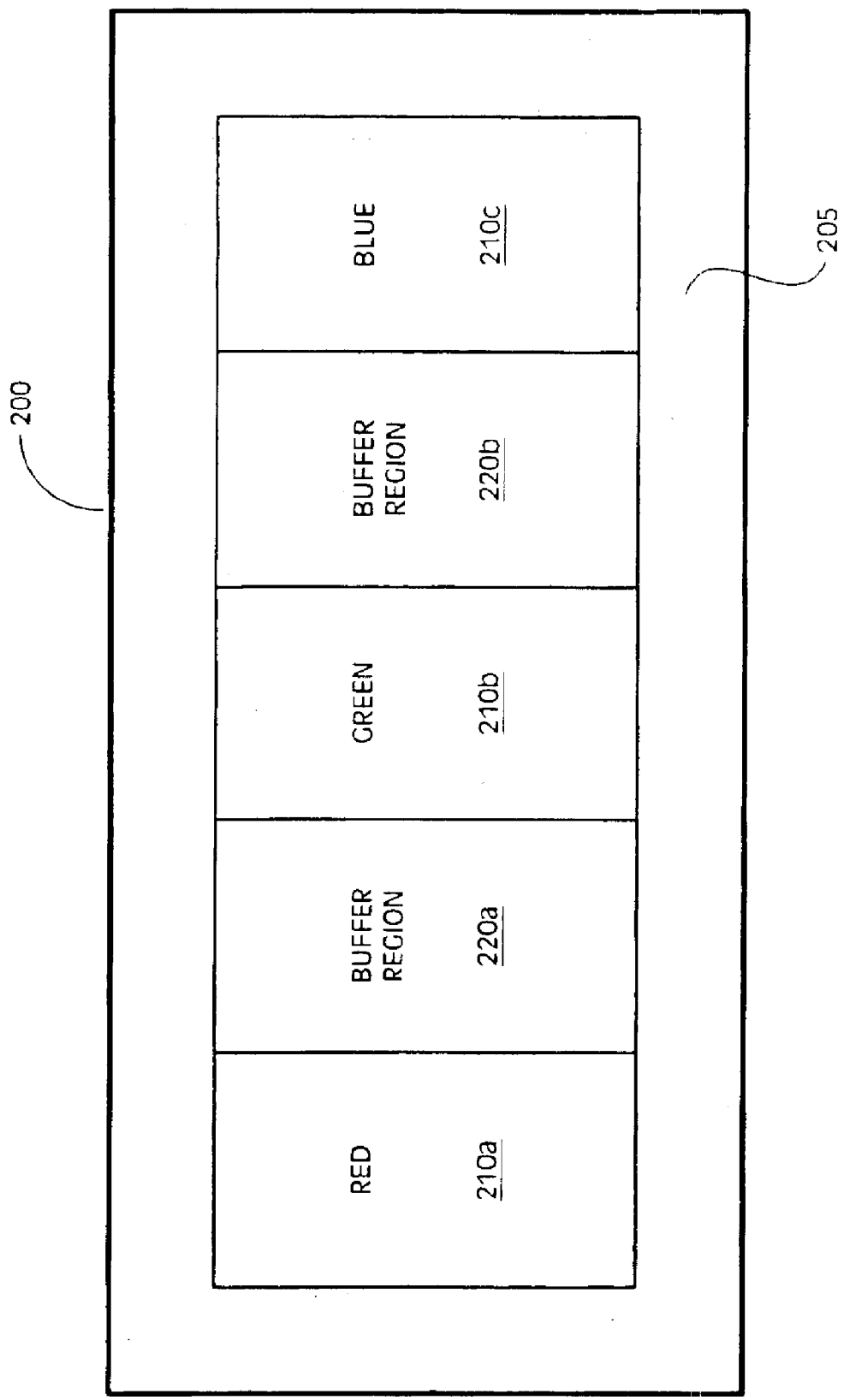
FIG. 2 is a schematic diagram illustrating an embodiment of a multi-array SLM device.

One embodiment of a multi-array SLM device 200 is illustrated in FIG. 2. The multi-array SLM device 200 includes three addressable arrays of elements 210a, 210b, 210c formed or otherwise disposed on a substrate 205. The addressable arrays 210a–c are separated from one another by buffer regions 220a–b, the addressable arrays 210a and 210b being separated by buffer region 220a and the addressable arrays 210b and 210c being separated by buffer region 220b. Each of the addressable arrays 210a–c may receive light of one color and, in response to the appropriate modulation signals, modulate the light component to generate an image in that color. For example, as shown in FIG. 2, the addressable array 210a may receive red light, the addressable array 210b may receive green light, and the addressable array 210c may receive blue light. In one embodiment, the substrate 205 comprises a semiconductor material (e.g., for LCOS devices and micromirror devices), and in another embodiment the substrate 205 comprises a glass material, quartz, or a clear polymer material, or other suitable material (e.g., for emissive devices and reflective and transmissive LCDs).

The addressable arrays of elements 210a–c may be of any suitable size. For example, each of the addressable arrays 210a–c may comprise 1,920×1,080 elements or pixels, which corresponds to the 16:9 ratio of the HDTV-1080i standard. The images produced by the addressable arrays 210a–c—and, hence, the single, converged image provided by converger 130—would each comprise a full-size image exhibiting a 16:9 aspect ratio. By way of further example, the addressable arrays 210a–c may each comprise: 1,280 by 720 elements providing a converged image exhibiting a 16:9 aspect ratio (e.g., for HDTV-720p); 800×600 elements, 1,024×768 elements, 1,600×1,200 elements, or 2,048×1,536 elements, each providing a converged image exhibiting a 4:3 aspect ratio (e.g., for SVGA, XGA, UXGA, and QXGA, respectively), or 1,280×1,024 elements providing a converged image exhibiting a 5:4 aspect ratio (e.g., for SXGA). It should be understood, however, that the addressable arrays 210a–c may have non-standard dimensions (in pixels), as well as a non-standard aspect ratio.

In one embodiment, an element of each of the addressable arrays 210a–c may comprise any suitable structure or device capable of modulating light. For example, an array element may comprise a liquid crystal element (i.e., as may be found in LCOS devices and LCDs) or a mirror (i.e., as may be found in a DMD™ or other micromirror device). As previously noted, in one embodiment, each of the addressable arrays 210a–c can receive a color of light and, through appropriate modulation or switching of the addressable array elements, generate an image of that color. For emissive devices, such as OLEDs and PLEDs, an array element comprises a light emitting diode element (or other light emitting device), and the addressable array of diode elements can be modulated to produce an image. Also, an image of a particular color produced by one of the addressable arrays 210a–c may include gray scaling (which may be provided by the modulation scheme employed). Further, although each of the addressable arrays 210a–c will typically be of equal size and dimensions, it should be understood that the addressable arrays 210a–c may be of unequal size and/or dimensions.

The buffer regions 220a, 220b separate each of the addressable arrays 210a–c from its neighboring or adjacent addressable array (or arrays). As is well known, light propagating from a source generally diverges with increasing distance from the source. Accordingly, providing buffer regions 220a–b between neighboring addressable arrays 210a–c allows for divergence of the images 202 produced by the addressable arrays 210a–c, as each of those images 202 propagates away from the SLM device 200. Compensating for divergence of the images 202 prevents interference between the images 202 and may increase optical efficiency. Although the buffer regions 220a–b are illustrated in FIG. 2 as being equal in size and, further, as being equal in size to the addressable arrays 210a–c, it should be understood that the buffer regions 220a–b may be of any suitable dimensions and need not be equal in size to one another or equal in size to the addressable arrays 210a–c. Also, in another embodiment, buffer regions are not provided between neighboring addressable arrays.

Returning to FIG. 1, the multiple color images 202 produced by multi-array SLM device 200 are provided to the converger 130, as noted above. The converger 130 converges the multiple color images 202 to create a single color image 132. Converger 130 may comprise any suitable device capable of converging or combining a number of images into a single image. The single color image 132 may then be output to the display 20 for viewing.

Modulation or switching of the elements of the addressable arrays 210a–c of multi-array SLM device 200 may be controlled by control circuitry 140. The control circuitry 140 may receive image data 14 from image generation unit 10 and generate the appropriate modulation signals 142 for SLM device 200. For example, in response to image data 14, the control circuitry 140 may generate a modulation signal (or series of signals) 142 that, when received by multi-array SLM device 200, direct SLM device 200 to activate (e.g., switch the state of) the appropriate elements of the addressable arrays in order to create the desired image or images. Control circuitry 140 may comprise any suitable processing device (or devices)—such as a microprocessor, DSP, ASIC, or other suitable processing device—and associated circuitry (e.g., memory).

It should be understood that the system 5 may include many additional elements—e.g., lenses, light pipes or integrators, a TIR (total internal reflection) prism, a PBS (polarized beam splitter), or a PCS (polarization conversion system)—which have been omitted for clarity and ease of understanding. For example, one or more lenses may be employed to channel light 112 from light source 110 to color generator 120. Similarly, one or more lenses may be used to direct the image 132 to the display 20 (such lens or lenses often referred to as "projection optics"). By way of further example, a TIR prism or a PBS may be used to direct the multiple color light components 122 provided by color generator 120 onto the addressable arrays of multi-array SLM device 200, wherein each color of light is channeled to its respective array of addressable elements.

It should also be understood that the system 5 may not include all of the elements shown in FIG. 1. In one embodiment, the display 20 may not form part of the system 5. For example, data projectors and cinema projectors, as well as other front projection systems, project images onto a front projection screen, and the projection screen may not be considered as part of the projector itself. It should be further understood that the configuration of system 5 is presented by way of example only and that numerous alternative configurations are possible. By way of example, the light source 110 may be a separate component from optics engine 100. By way of further example, image generation unit 10 may form part of the optics engine 100 and, in one embodiment, may be integrated (or share circuitry) with control circuitry 140.

Figure 3A:
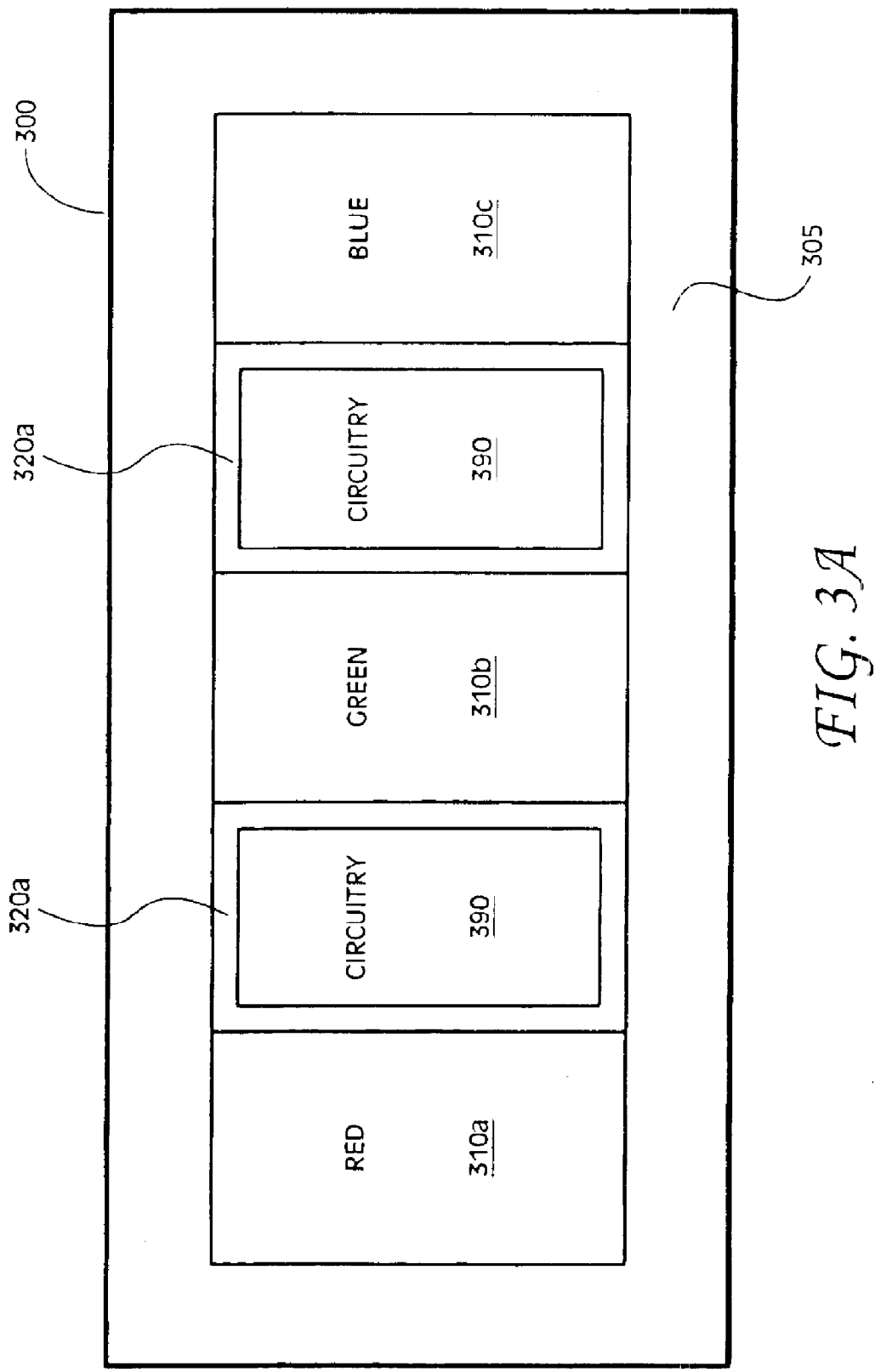
FIG. 3A is a schematic diagram illustrating another embodiment of a multi-array SLM device.

Further embodiments of a multi-array SLM device are illustrated in FIGS. 3A through 11. Referring to FIG. 3A, a multi-array SLM device 300 includes three (or other suitable number) addressable arrays of elements 310a, 310b, 310c formed or disposed on a substrate 305. Each of the addressable arrays 310a–c can receive a light component 122 of one color—for example, as shown in FIG. 3A, addressable array 310a may receive red light, addressable array 310b may receive green light, and addressable array 310c may receive blue light—and, through appropriate modulation or switching, generate an image of that color. Again, emissive devices (e.g., OLEDs and PLEDs) include an addressable array of diode elements, each capable of emitting light, and the addressable array of diode elements can be modulated to generate an image of a particular color. The multi-array SLM device 300 also includes buffer regions 320a–b separating the addressable arrays 310a–c from one another (e.g., buffer region 320a separates neighboring arrays 310a and 310b and buffer region 320b separates neighboring arrays 310*b* and 310*c*). In one embodiment, the substrate 305 comprises a semiconductor material (e.g., for LCOS devices and micromirror devices), and in another embodiment the substrate 305 comprises a glass material, quartz, a clear polymer material, or other suitable material (e.g., for emissive devices and reflective and transmissive LCDs). The multi-array SLM device 300 generally functions in a manner similar to the multi-array SLM device 200 described above.

Figure 3B:
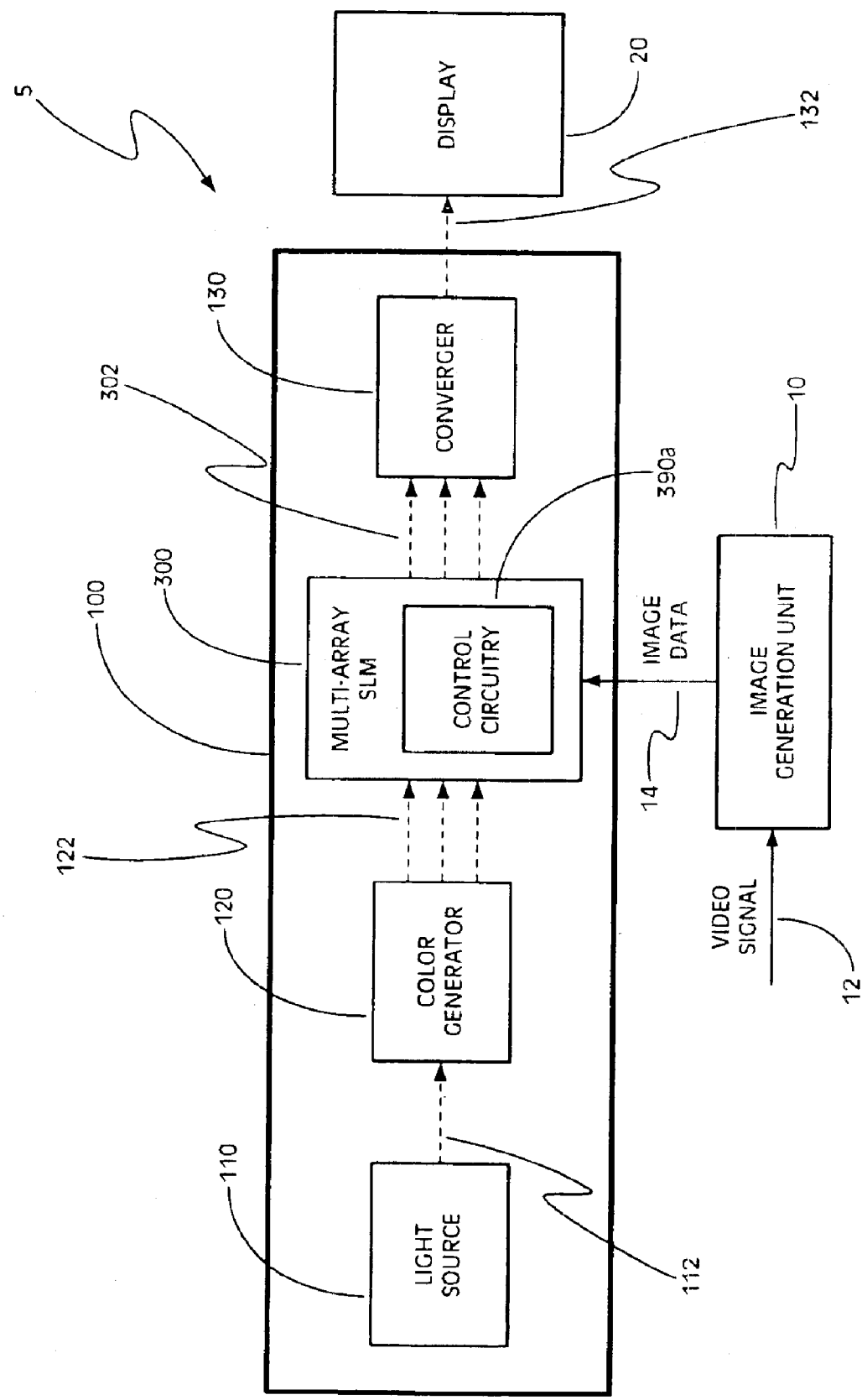
FIG. 3B is a schematic diagram illustrating another embodiment of a system including a multi-array SLM device.
Figure 3C:
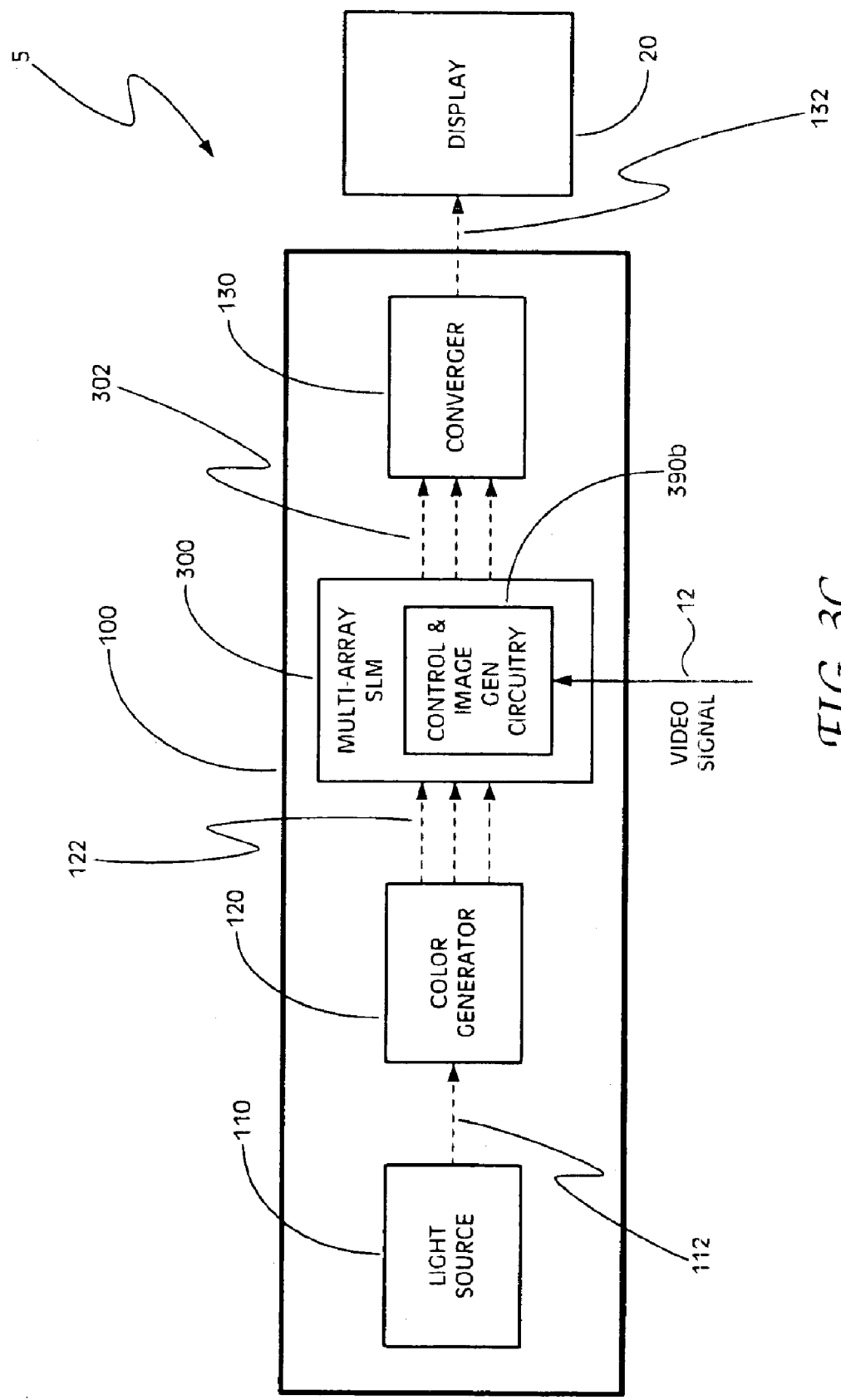
FIG. 3C is a schematic diagram illustrating a further embodiment of a system including a multi-array SLM device.

Conventional SLM devices manufactured using integrated circuit technology (e.g., LCOS devices) and/or MEMS technology (e.g., micromirror devices such as the DMD™) generally include driver circuitry associated with each element of the addressable array, wherein it is the driver circuitry that switches the state of the element or otherwise modulates the element in response to the appropriate electrical signal. Typically, this driver circuitry is formed at an intermediate layer underneath the addressable array. However, in addition to such driver circuitry, the multi-array SLM device 300 further includes circuitry 390 formed in buffer regions 320*a–b*. Utilizing buffer regions 320*a–b* for circuitry 390 provides for greater system integration and part reduction. For example, as illustrated in FIG. 3B, the multi-array SLM device 300 may, in one embodiment, include control circuitry 390*a* formed in the buffer regions 320*a–b*, thereby eliminating the separate control circuitry 140 (see FIG. 1) and the components (e.g., processing devices, memory chips, etc.) associated therewith. In yet another embodiment, as illustrated in FIG. 3C, further integration is achieved by integrating the image generation unit 10 (see FIG. 1) into the multi-array SLM device 300. Referring to FIG. 3C, the multi-array SLM device 300 includes control and image generation circuitry 390*b* formed in the buffer regions 320*a–b*. The embodiments of FIGS. 3B and 3C are presented by way of example only, and any level of system integration may be achieved utilizing circuitry formed in the buffer regions of a multi-array SLM device. A semiconductor device exhibiting such integration of multiple devices or components into a single integrated circuit chip is commonly referred to as a System On Chip (SOC) device.

Figure 4:
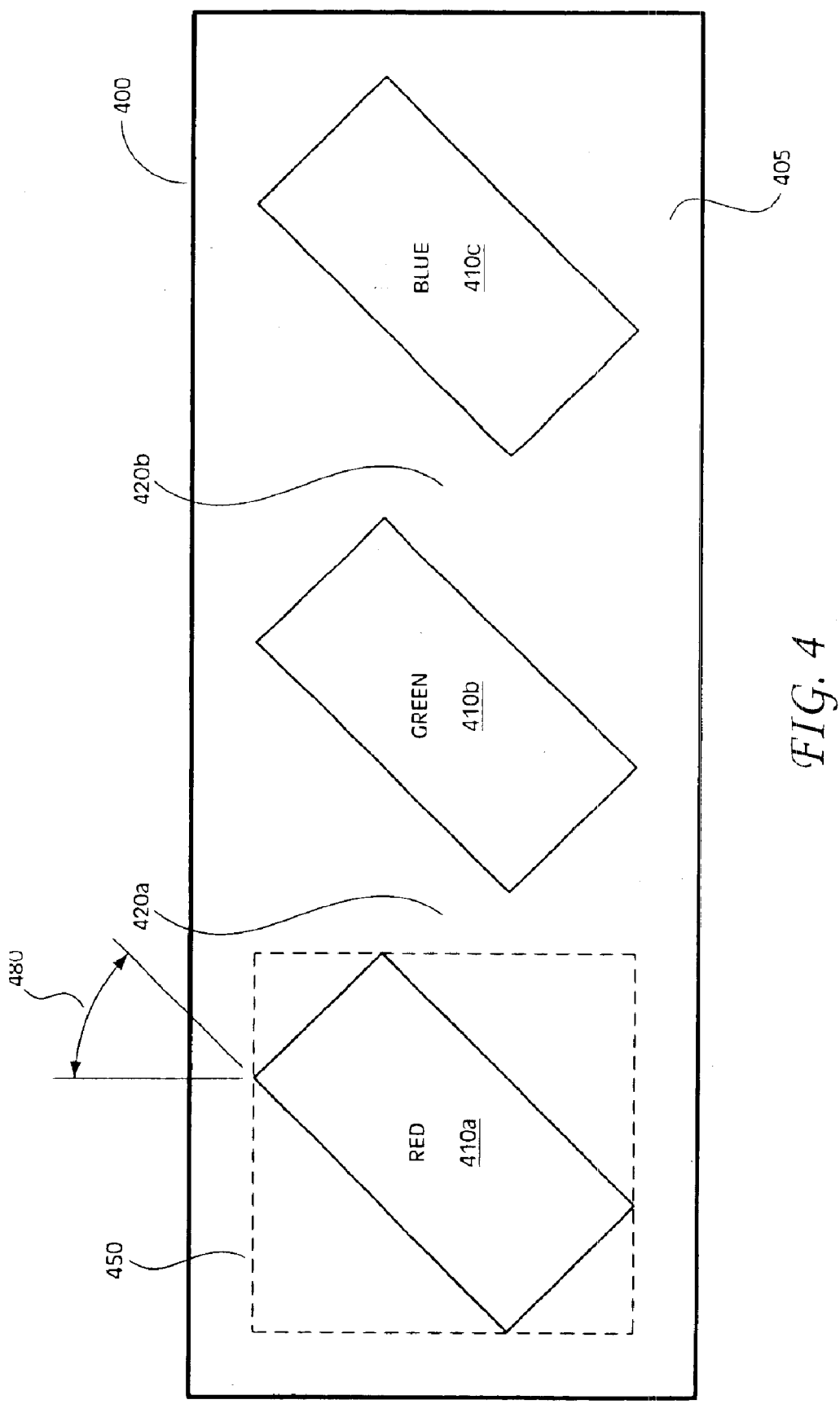
FIG. 4 is a schematic diagram illustrating a further embodiment of a multi-array SLM device.

Referring to FIG. 4, another embodiment of a multi-array SLM device 400 is illustrated. The multi-array SLM device 400 includes three (or other suitable number) addressable arrays of elements 410*a*, 410*b*, 410*c* formed or disposed on a substrate 405. Each of the addressable arrays 410*a–c* can receive a light component 122 of one color and, through appropriate modulation or switching, generate an image of that color. For example, as shown in FIG. 4, addressable array 410*a* may receive red light, addressable array 410*b* may receive green light, and addressable array 410*c* may receive blue light. Each of the addressable arrays 410*a–c* is oriented at an angle 480 of approximately forty-five degrees (45°) on substrate 405. The multi-array SLM device 400 also includes buffer regions 420*a–b* separating the addressable arrays 410*a–c* from one another (e.g., region 420*a* separates neighboring arrays 410*a* and 410*b* and region 420*b* separates neighboring arrays 410*b* and 410*c*), and these buffer regions 420*a–b* may include circuitry, as described above. The substrate 405 may comprise a semiconductor material or other suitable material. The multi-array SLM device 400 generally functions in a manner similar to the SLM device 200 and/or the SLM device 300 described above.

Each element of the addressable array of a Digital Micromirror Device™ comprises a generally square-shaped mirror that rotates, or tilts, about an axis extending between opposite corners of the mirror. Because each mirror element, when switched, tilts about an axis extending from corner to corner (as opposed to rotating about an axis extending along an edge of the mirror), a DMD is typically oriented at a forty-five degree angle relative to any adjacent optical components (e.g., a TIR prism or the converger 130). Accordingly, the embodiment of FIG. 4 may be useful for a micromirror device (such as a DMD™ type device), where it may be necessary to orient each addressable array at a forty-five degree angle relative to other optical components.

In a further embodiment illustrated in FIG. 4, each of the addressable arrays 410*a–c* may comprise a portion of a larger addressable array. This embodiment is illustrated for one of the addressable arrays 410*a* in FIG. 4 by the dashed line surrounding this addressable array. The dashed line represents a larger addressable array 450, wherein only a selected portion of the addressable array 450 is utilized to provide the addressable array 410*a*. The remaining portions of the addressable array 450 are unused (i.e., not used to create an image for viewing).

Figure 5:
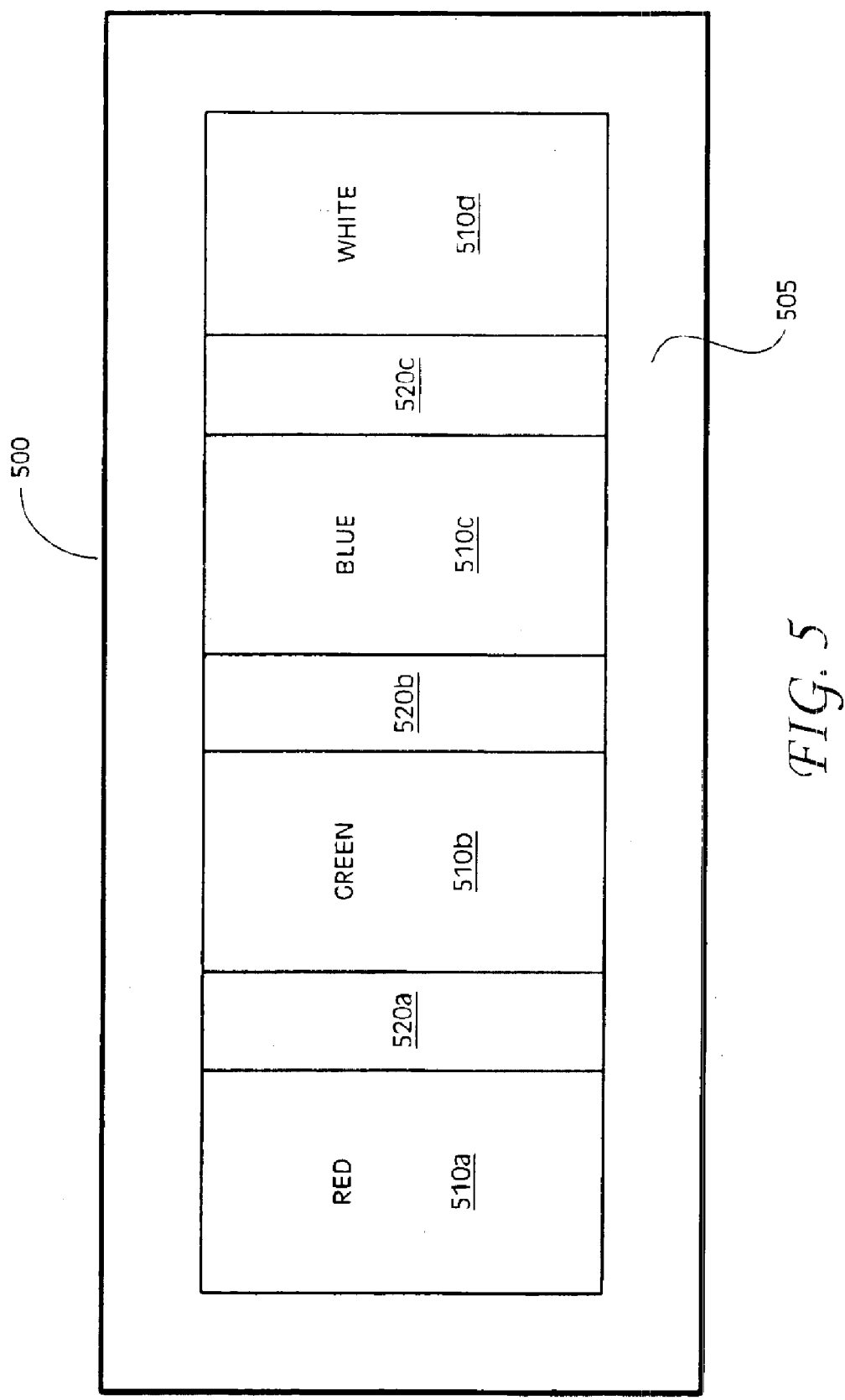
FIG. 5 is a schematic diagram illustrating yet another embodiment of a multi-array SLM device.

Referring to FIG. 5, a further embodiment of a multi-array SLM device 500 is illustrated. The multi-array SLM device 500 includes four addressable arrays of elements 510*a*, 510*b*, 510*c*, 510*d* formed or disposed on a substrate 505. In one embodiment, the substrate 505 comprises a semiconductor material (e.g., for LCOS devices and micromirror devices), and in another embodiment the substrate 505 comprises a glass material, quartz, a clear polymer material, or other suitable material (e.g., for emissive devices and reflective and transmissive LCDs). Each of the addressable arrays 510*a–d* can receive (or emit) a color light component and, through appropriate modulation or switching, generate and image of that color. For example, as shown in FIG. 5, addressable array 510*a* may receive red light, addressable array 510*b* may receive green light, addressable array 510*c* may receive blue light, and addressable array 510*d* may receive white light. The addition of an addressable array 510*d* to produce an image from white light may be used to provide images of increased brightness. The multi-array SLM device 500 also includes buffer regions 520*a–c* separating the addressable arrays 510*a–d* from one another, and each of the buffer regions 520*a–c* may include circuitry, as described above. However, in the embodiment illustrated in FIG. 5, the buffer regions 520*a–c* are not equal in size and dimensions to the addressable arrays 510*a–d*. The multi-array SLM device 500 generally functions in a manner similar to the SLM device 200 and/or the SLM device 300 described above.

Figure 6A:
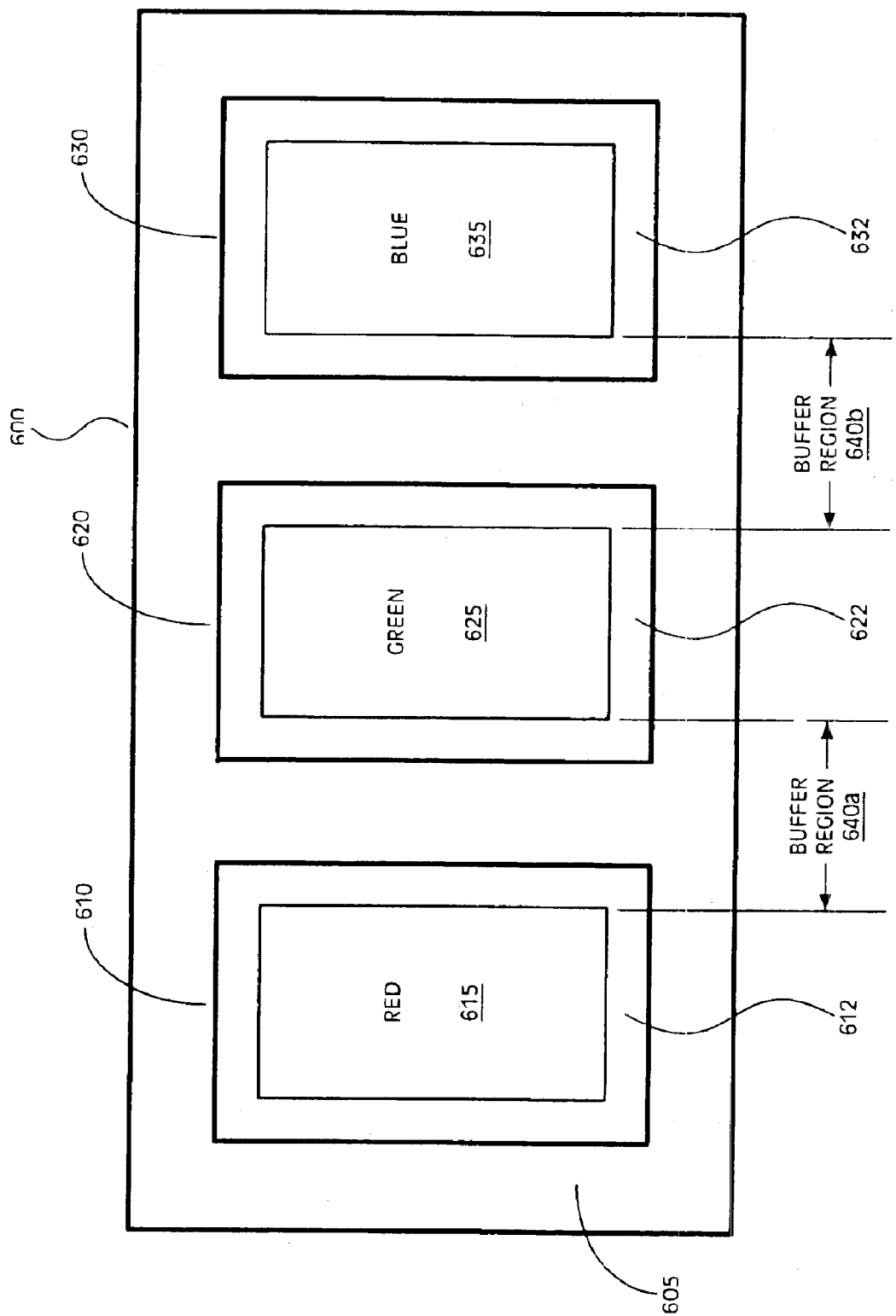

Further embodiments of a multi-array SLM device are illustrated in FIGS. 6A through 6D, 7, and 8. Referring to FIG. 6A, a multi-array SLM device 600 comprises a substrate 605 having SLM devices 610, 620, 630 disposed thereon. Each SLM device 610, 620, 630 comprises a substrate 612, 622, 632 having an addressable array of elements 615, 625, 635 formed or disposed thereon, respectively. The addressable arrays 615, 625, 635 of the SLM devices 610, 620, 630, respectively, can each receive (or emit) light of one color and modulate the light to produce an image of that color. For example, as shown in FIG. 6A, the addressable array 615 may receive red light, the addressable array 625 may receive green light, and the addressable array 635 may receive blue light. A buffer region 640*a* separates the addressable arrays 615, 625 of neighboring SLM devices 610, 620, respectively, and a buffer region 640*b* separates the addressable arrays 625, 635 of neighboring SLM devices 620, 630, respectively. In one embodiment, additional devices and/or circuitry (e.g., processing devices or circuitry, memory devices or circuitry, etc.) may be disposed in the buffer regions 640*a*, 640*b*.

The SLM devices 610, 620, 630 may each comprise an LCOS device, an LCD (either transmissive or reflective), an emissive device (e.g., an OLED or PLED device), or a micromirror device (e.g., a DMD™), as well as any other device having an addressable array of elements capable of modulating light incident thereon. In one embodiment, the substrates 612, 622, 632 may each comprise a semiconductor material (e.g., for LCOS devices and micromirror devices), and in another embodiment the substrates 612, 622, 632 may each comprise a glass material, quartz, a clear polymer material, or other suitable material (e.g., for emissive devices and reflective and transmissive LCDs).

An elevation view of the multi-array SLM device 600 is shown in FIG. 6B. In the embodiment of FIG. 6B, the SLM devices 610, 620, 630 are disposed on substrate 605 generally along a plane. In another embodiment, as illustrated in the elevation view of FIG. 6C, a multi-array SLM device 600' includes SLM devices 610, 620, 630 disposed on substrate 605', wherein the SLM devices 610, 620, 630 are vertically offset relative to one another. In a further embodiment, as illustrated in the elevation view of FIG. 6D, a multi-array SLM device 600" includes SLM devices 610, 620, 630 disposed on substrate 605", wherein the SLM devices 610, 620, 630 are angularly offset relative to one another (this angular offset being in lieu of or, in another embodiment, in addition to the vertical offset shown in FIG. 6C). It should be understood that, for the multi-array SLM devices illustrated in FIGS. 2 through 5, the addressable arrays may be vertically offset relative to one another and/or angularly offset relative to one another, as illustrated in FIGS. 6C and 6D, respectively. For chip scale type devices, such as LCOS devices and micromirror devices, such offset may be on the order of a few microns ($\mu$m) or less.

Figure 7:
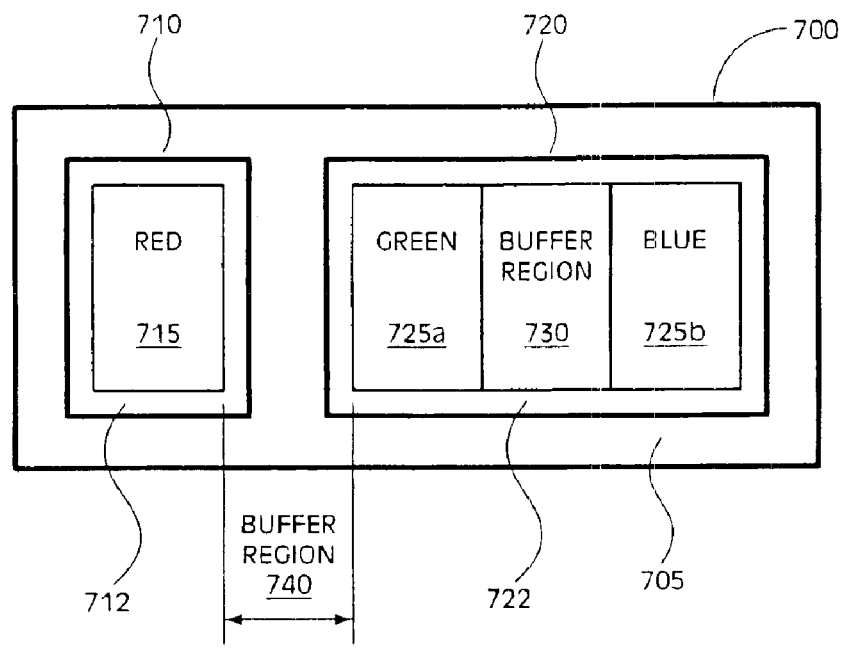
FIG. 7 is a schematic diagram illustrating yet a further embodiment of a multi-array SLM device.

Turning now to FIG. 7, a multi-array SLM device 700 comprises a substrate 705 having SLM devices 710, 720 disposed thereon. The SLM device 710 has an addressable array of elements 715 formed or disposed on a substrate 712 (e.g., a semiconductor material, a glass material, a clear polymer, quartz, or other suitable material, as previously described), wherein the addressable array 715 may receive (or emit) light of one color (e.g., red) and, through appropriate modulation, produce an image of that color. The SLM device 720 has a first addressable array 725a and a second addressable array 725b, both formed or disposed on a substrate 722 (e.g., a semiconductor material, a glass material, a clear polymer, quartz, or other suitable material, as previously described). The addressable arrays 725a, 725b are separated by a buffer region 730. Each of the addressable arrays 725a–b may receive (or emit) light of one color (e.g., green and blue, respectively) and modulate the light to produce an image of that color. A buffer region 740 also separates the addressable array 715 of SLM device 710 from addressable array 725a of SLM device 720. The buffer regions 730, 740 compensate for divergence and the buffer region 730 may include circuitry, as previously described. Also, additional devices and/or circuitry (e.g., processing devices or circuitry, memory devices or circuitry, etc.) may be disposed in the buffer region 740.

Figure 8:
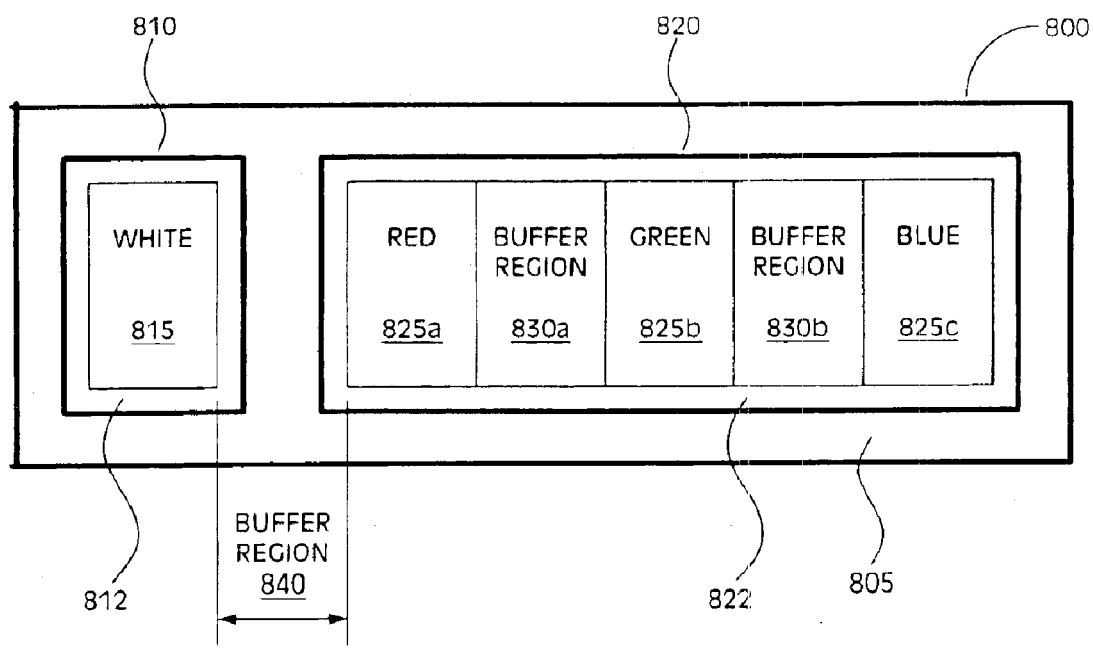
FIG. 8 is a schematic diagram illustrating another embodiment of a multi-array SLM device.

Referring to FIG. 8, a multi-array SLM device 800 comprises a substrate 805 having SLM devices 810, 820 disposed thereon. The SLM device 810 has an addressable array of elements 815 formed or disposed on a substrate 812 (e.g., a semiconductor material, a glass material, a clear polymer, quartz, or other suitable material, as previously described), wherein the addressable array 815 may receive (or emit) light of one color (e.g., white) and, through appropriate modulation, produce an image of that color. The SLM device 820 has three addressable arrays of elements 825a, 825b, 825c formed or disposed on a substrate 822 (e.g., a semiconductor material, a glass material, a clear polymer, quartz, or other suitable material, as previously described). The neighboring addressable arrays 825a and 825b are separated by a buffer region 830a, and the neighboring addressable arrays 825b and 825c are separated by a buffer region 830b. Each of the addressable arrays 825a–c may receive (or emit) light of one color (e.g., red, green, and blue, respectively) and modulate the light to produce an image of that color. A buffer region 840 also separates the addressable array 815 of SLM device 810 from addressable array 825a of SLM device 820. The buffer regions 830a, 830b, 840 compensate for divergence and the buffer regions 830a, 830b (as well as buffer region 840) may include circuitry, as previously described. Further, additional devices and/or circuitry (e.g., processing devices or circuitry, memory devices or circuitry, etc.) may be disposed in the buffer region 840.

Each of the embodiments of a multi-array SLM device illustrated in FIGS. 6A–D, 7, and 8, respectively, comprises two or more discrete SLM devices—each discrete device including one or more addressable arrays—disposed on a common substrate. Each of the multi-array SLM devices 600, 700, 800 generally functions in a manner similar to that of multi-array SLM devices 200, 300 described above with respect to FIGS. 1, 2, and 3A–B. The substrate (e.g., substrates 600, 605', 605", 705, or 805) may comprise any suitable material, including, for example, semiconductor materials, glass and clear polymer materials, and multi-layered composite materials (e.g., circuit board materials), as well as others. Also, additional devices and/or circuitry (e.g., processing devices or circuitry, memory devices or circuitry, etc.) may be disposed or formed on the substrate to perform any desired function (e.g., those of control circuitry 140 or those of image generation unit 10), and these additional devices and/or circuitry may be disposed in the buffer regions, as noted above.

Figure 9A:
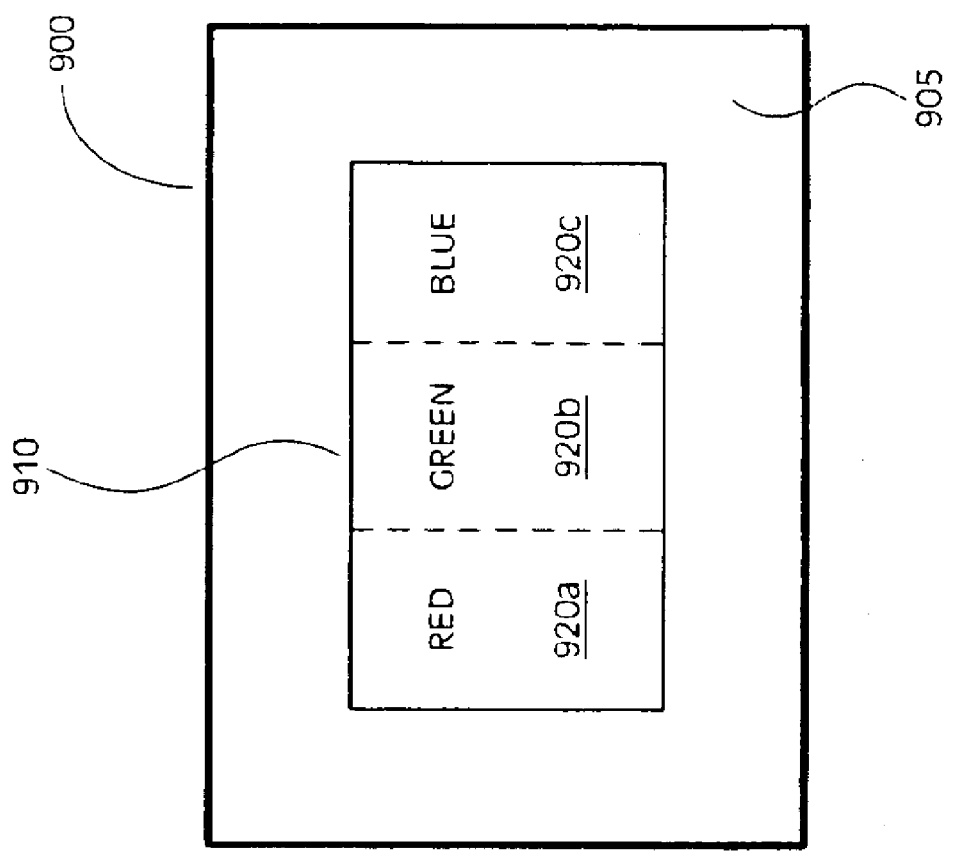

Additional embodiments of a multi-array SLM device are shown in FIGS. 9A through 9E, 10, and 11. Turning to FIG. 9A, a multi-array SLM device 900 includes an addressable array of elements 910 formed or disposed on a substrate 905 (e.g., a semiconductor material, a glass material, a clear polymer, quartz, or other suitable material, as previously described). Each array element of addressable array 910 comprises, for example, a liquid crystal element (as may be found in LCOS devices and LCDs), a micromirror (as may be found in a DMD™), or other suitable device or structure capable of modulating incident light. Also, each array element of addressable array 910 may comprise a light emitting diode element (as may be found in OLEDs, PLEDs, and other emissive devices). The addressable array 910 is divided or segmented into a number of subarrays 920a, 920b, 920c. Each of the subarrays 920a–c can receive (or emit) a color of light (e.g., red, green, and blue, respectively) and, through appropriate modulation or switching of the addressable array elements of the subarray, generate an image of that color. Again, it should be understood that an image of a particular color produced by a subarray of the addressable array may include gray scaling (which may be provided by the modulation scheme employed).

The addressable array of elements 910 of multi-array SLM device 900 may be of any suitable size. In one embodiment, SLM device 900 may comprise a standard device for HDTV-720p applications that includes an addressable array comprising 1,280×720 elements or pixels. The addressable array of 1,280×720 elements is segmented into three subarrays 920a–c, each subarray comprising 426×720 elements. Note that the image produced by each of the subarrays 920*a–c*—and, hence, the final converged image provided by converger 130—will be one-third (⅓) the size of the standard HDTV-720p image (i.e., one-third of the standard 16:9 aspect ratio).

In another embodiment, the multi-array SLM device 900 includes an addressable array 910 that is three times the size of the desired, standard size image. For example, the addressable array 910 may comprise 1,280×2,160 pixels that is segmented into three subarrays 920*a–c*, each comprising 1,280×720 pixels. For this embodiment, the image produced by each subarray 920*a–c*—and, thus, the final converged image—will be full size (i.e., an image having a 16:9 aspect ratio for HDTV-720p). Such a 3×-scale SLM device may be of any suitable size. By way of further example, the addressable array 910 may comprise 1,024×2,304 pixels that is segmented into three subarrays 920*a–c*, each comprising 1,024×768 pixels (i.e., for XGA applications). It should be understood that the addressable array 910 of SLM device 900 may be segmented with respect to either orthogonal axis of the addressable array. Returning to the above example of a standard HDTV-720p SLM device, the addressable array of 1,280×720 pixels may be segmented into subarrays of 426×720 pixels each, as previously noted, or segmented into subarrays of 1,280×240 pixels each.

Other embodiments of a multi-array SLM device 900 are illustrated in FIGS. 9B–9E. Referring to FIG. 9B, the addressable array 910 of multi-array SLM device 900 is segmented into four subarrays 920*a*, 920*b*, 920*c*, 920*d*. Each of the subarrays 920*a–d* can receive (or emit) light of one color and, by appropriate modulation, generate an image of that color. By way of example, subarray 920*a* may receive red light, subarray 920*b* may receive green light, subarray 920*c* may receive blue light, and subarray 920*d* may receive white light. Employing an additional subarray to receive and generate an image using white light may be used to generate images exhibiting greater brightness.

Turning to FIG. 9C, a portion 991 of the addressable array 910 of multi-array SLM device 900 is segmented into three subarrays 920*a*, 920*b*, 920*c* (or other suitable number of subarrays). Each of the subarrays 920*a–c* may receive (or emit) light of one color (e.g., red, green, and blue, respectively) and modulate the light to produce an image of that color. Another portion 992 of the addressable array 910 is, however, unused (i.e., not used to create an image for viewing). In yet another embodiment, as shown in FIG. 9D, the addressable array 910 of multi-array SLM device 900 is divided into subarrays 920*a*, 920*b*, 920*c* (or other suitable number of subarrays), wherein each of the subarrays 920*a–c* may receive (or emit) light of one color and modulate the light to generate an image of that color. However, a portion 930*a*, 930*b*, 930*c* of each subarray 920*a–c*, respectively, is unused. The embodiments illustrated and described with respect to each of FIGS. 9C and 9D may be useful where it is desired to adapt an SLM device having an addressable array of a given size (e.g., 1024 pixels by 768 pixels) to provide an image of a particular aspect ratio (e.g., any aspect ratio smaller than 1024 by 768).

Yet a further embodiment of the multi-array SLM device 900 is shown in FIG. 9E. The addressable array 910 is segmented into three subarrays 920*a*, 920*b*, 920*c* (or other suitable number of subarrays). Each subarray 920*a–c* can receive (or emit) light of one color (e.g., red, green, and blue, respectively) and, by appropriate modulation, generate an image of that color. However, buffer regions 940*a*, 940*b* are provided between adjacent subarrays, the buffer regions 940*a–b* allowing for image divergence, as previously described. Within each buffer region 940*a–b*, the addressable array elements are unused.

Figure 10:
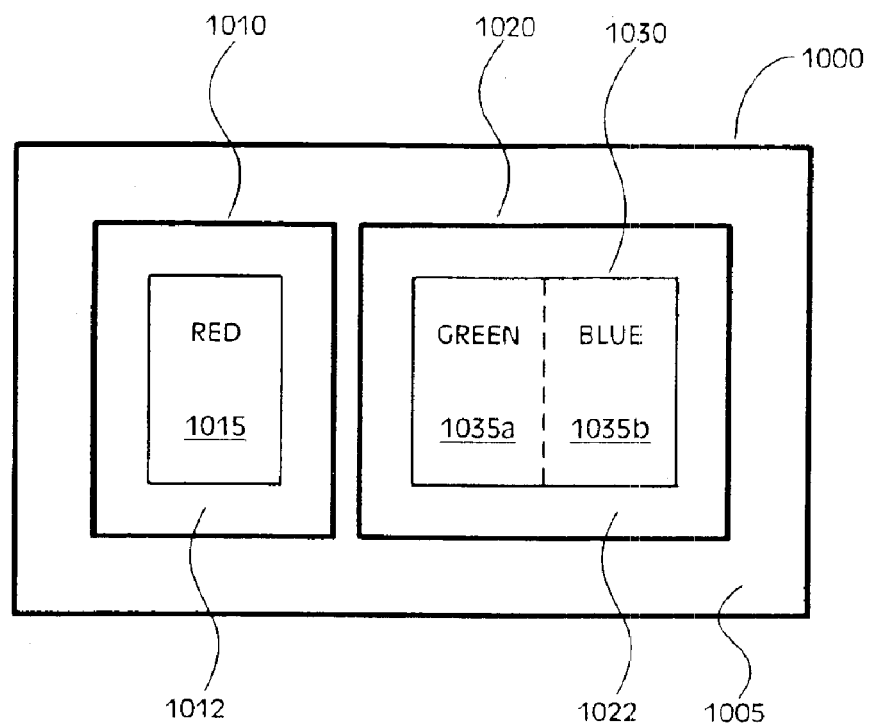
FIG. 10 is a schematic diagram illustrating another embodiment of a multi-array SLM device.

Referring now to FIG. 10, a multi-array SLM device 1000 comprises a substrate 1005 having SLM devices 1010, 1020 disposed thereon. The SLM device 1010 has an addressable array of elements 1015 formed or disposed on a substrate 1012 (e.g., a semiconductor material, a glass material, a clear polymer, quartz, or other suitable material, as previously described), wherein the addressable array 1015 may receive (or emit) light of one color (e.g., red) and, through appropriate modulation, produce an image of that color. The SLM device 1020 has an addressable array of elements 1030 formed or disposed on a substrate 1022 (e.g., a semiconductor material, a glass material, a clear polymer, quartz, or other suitable material, as previously described). The addressable array 1030 is segmented into two subarrays 1035*a*, 1035*b*, and each of the subarrays 1025*a–b* may receive (or emit) light of one color (e.g., green and blue, respectively) and modulate the light to produce an image of that color.

Figure 11:
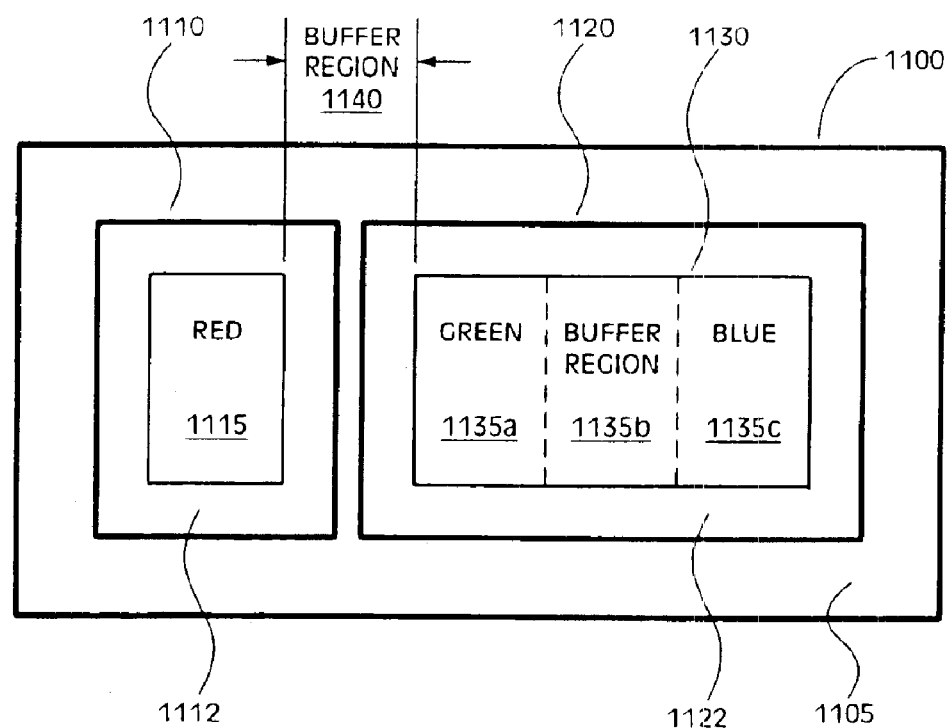
FIG. 11 is a schematic diagram illustrating yet another embodiment of a multi-array SLM device.

Turning now to FIG. 11, a multi-array SLM device 1100 comprises a substrate 1105 having SLM devices 1110, 1120 disposed thereon. The SLM device 1110 has an addressable array of elements 1115 formed or disposed on a substrate 1112 (e.g., a semiconductor material, a glass material, a clear polymer, quartz, or other suitable material, as previously described), wherein the addressable array 1115 may receive (or emit) light of one color (e.g., red) and, through appropriate modulation, produce an image of that color. The SLM device 1120 has an addressable array of elements 1130 (e.g., a semiconductor material, a glass material, a clear polymer, quartz, or other suitable material, as previously described). The addressable array 1130 is divided into three subarrays 1135*a*, 1135*b*, 1135*c*, and the subarrays 1135*a*, 1135*c* may each receive (or emit) light of one color (e.g., green and blue, respectively) and modulate the light to produce an image of that color. The remaining subarray 1135*b* separating the subarrays 1135*a*, 1135*c* may be used as a buffer region, wherein the elements of the buffer region 1135*b* are not used to create an image. In another embodiment, the subarray 1135*b* is also utilized to modulate a component of light. A buffer region 1140 may also separate the addressable array 1115 of SLM device 1110 from the subarray 1135*a* of SLM device 1120.

Each of the embodiments of a multi-array SLM device illustrated in FIGS. 10 and 11, respectively, comprises two or more discrete SLM devices disposed on a common substrate. The substrate (e.g., substrates 1005, 1105) may comprise any suitable material, including, for example, semiconductor materials, glass and clear polymer materials, and multi-layered composite materials (e.g., circuit board materials), as well as others. Also, additional devices and/or circuitry (e.g., processing devices or circuitry, memory devices or circuitry, etc.) may be disposed or formed on the substrate to perform any desired function (e.g., those of control circuitry 140 or those of image generation unit 10).

Also encompassed within the present invention are methods of manufacturing the disclosed embodiments of a multi-array SLM device. Methods for fabricating LCOS devices, reflective LCDs, transmissive LCDs, emissive devices (e.g., OLEDs, PLEDs, etc.), and micromirror devices are well known in the art. A multi-array SLM device—whether comprising an LCOS device, a reflective or transmissive LCD, an emissive device, or a micromirror device—may be manufactured using such conventional fabrication techniques. It should be understood, however, that a multi-array SLM device may be fabricated using new manufacturing technologies (e.g., those aimed at reducing feature size, increasing yield, improving performance, etc.), or a combination of conventional and new fabrication techniques.

Figure 12:
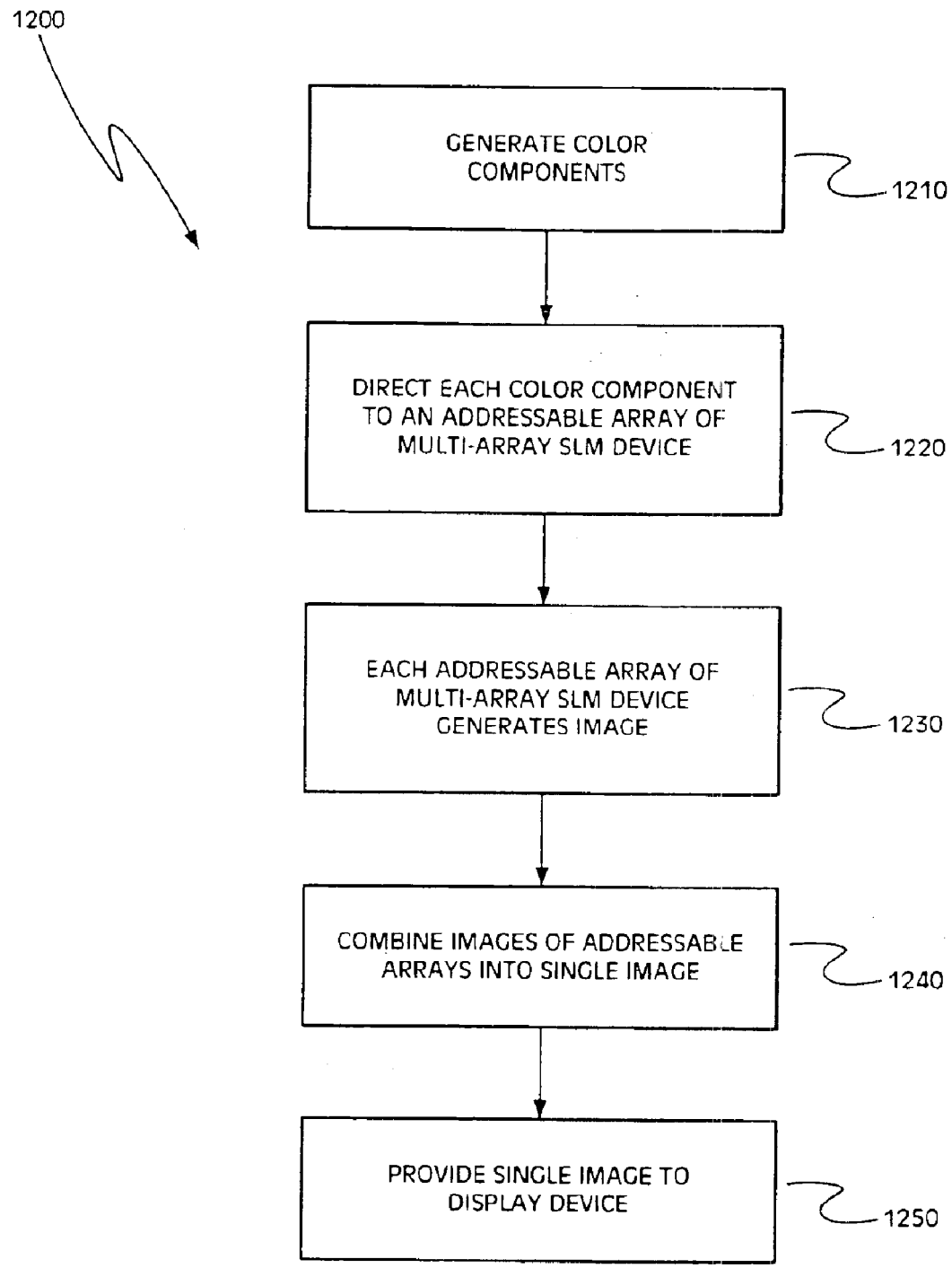
FIG. 12 is a block diagram illustrating an embodiment of a method of generating an image using a multi-array SLM device.

The embodiments 200, 300, 400, 500, 600, 700, 800, 900, 1000, 1100 of a multi-array SLM device described above, as well as the embodiments of the system 5 set forth above, may be better understood by reference to an embodiment of a method 1200 of generating an image, as illustrated in FIG. 12. Schematic diagrams illustrating specific examples of the method 1200 of generating an image are provided in each of FIGS. 13 and 14.

Referring to block 1210 in FIG. 12, a number of color light components are generated (e.g., as may be performed by color generator 120). As shown at block 1220, each of the color components is then directed to an addressable array of elements of a multi-array SLM device (e.g., SLM devices 200, 300, 400, 500, 600, 700, 800, 900, 1000, 1100, as illustrated in FIGS. 2 through 11). Referring to block 1230, each addressable array of elements of the multi-array SLM device generates an image in its respective color component (again, the respective images of the addressable arrays may include gray scaling). To create the images, the elements of each addressable array may be switched or modulated in response to appropriate modulation signals provided by control circuitry 140 (or 390a) and/or image generation unit 10 (or control and image generation circuitry 390b, as shown in FIG. 3C).

Referring now to block 1240 in FIG. 12, the images produced by the individual addressable arrays of the multi-array SLM device are combined or converged (e.g., as may be performed by converger 130) into a single image (e.g., a single color image). The single image may then be output or directed to a display device for viewing, as shown at block 1250. It should be understood that the single image may comprise one of a sequence of images in a television program (or other video program) and, further, that the method 1200 may be repeated for each image in the sequence.

Figure 13:
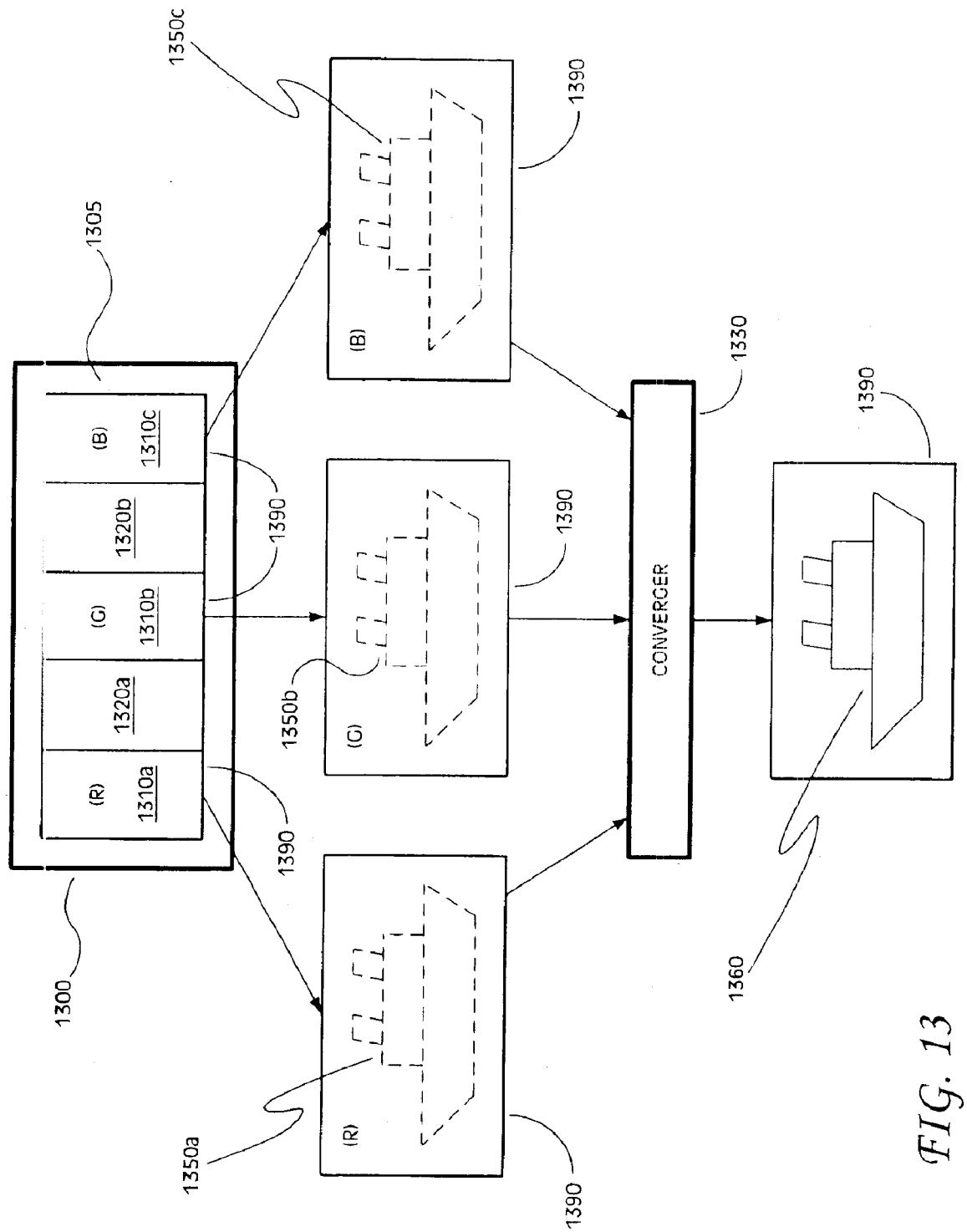
FIG. 13 is a schematic diagram illustrating an example of the method of generating an image shown in FIG. 12.

Illustrated in FIG. 13 is one example of the method 1200 of generating an image, wherein each addressable array of elements 1310a, 1310b, 1310c of a multi-array SLM device 1300 provides an aspect ratio 1390 that is the same, or nearly the same, as the display to which the image or sequence of images will be output (or that is the same as the desired output image size). For example, each addressable array 1310a–c may include an addressable array of 1,280 by 720 elements or pixels providing a 16:9 aspect ratio (e.g., for HDTV-720p applications), an array of 1,920 by 1,080 elements also providing a 16:9 aspect ratio (e.g., for HDTV-1080i applications), an array of 800 by 600 elements providing a 4:3 aspect ratio (e.g., for SVGA applications), an array of 1,024 by 768 elements providing a 4:3 aspect ratio (e.g., for XGA applications), an array 1,600 by 1,200 elements providing a 4:3 aspect ratio (e.g., for UXGA applications), an array of 2,048 by 1,536 elements also providing a 4:3 aspect ratio (e.g., for QXGA applications), or an array of 1,280 by 1,024 elements providing a 5:4 aspect ratio (e.g., for SXGA applications).

Each of the addressable arrays 1310a–c of multi-array SLM device 1300 is capable of receiving (or emitting) light of one color and producing an image of that color. By way of example, as illustrated in FIG. 13, the addressable array 1310a may receive (or emit) red (R) light, the addressable array 1310b may receive (or emit) green (G) light, and the addressable array 1310c may receive (or emit) blue (B) light. The addressable arrays 1310a–c are separated from one another by buffer regions 1320a, 1320b in a manner similar to that described above. For the embodiment illustrated in FIG. 13, the three addressable arrays 1310a–c will generally be of equal, or approximately equal, size and dimensions (i.e., they have the same aspect ratio 1390).

By appropriate modulation, the addressable array 1310a creates an image 1350a in the color red (once again, this image may include gray scaling) having an aspect ratio 1390 that is the same, or nearly the same, as the aspect ratio of addressable array 1310a. Thus, the aspect ratio 1390 of image 1350a is the same, or nearly the same, as the aspect ratio of the display to which the image will be output (i.e., image 1350a is a "full-size" image). Similarly, the addressable array 1310b generates an image 1350b in the color green, and the addressable array 1310c generates an image 1350c in the color blue, each of the images 1350b, 1350c having the aspect ratio 1390 that is equivalent (or nearly equivalent) to the aspect ratio of the output display (and their respective addressable arrays 1310b–c).

The three color images 1350a–c are then combined by a converger 1330 into a single image 1360 having an aspect ratio 1390 that is equal, or nearly equal, to the aspect ratio of the output display (and to the aspect ratio of each of the addressable arrays 1310a–c). By way of example, the single image 1360 may have an aspect ratio of 5:4 (e.g., for SXGA), an aspect ratio of 16:9 (e.g., for HDTV-720p and HDTV-1080i), or an aspect ratio of 4:3 (e.g., for SVGA, XGA, UXGA, and QXGA). The embodiment illustrated by FIG. 13 may find application in, for example, rear-projection televisions, data projectors, computer monitors, and other video display applications.

The example illustrated in FIG. 13 assumes that each addressable array of the multi-array SLM device has an aspect ratio 1390 that is the same as that of the output display (or that of the desired output image size). The embodiment of FIG. 13 could, therefore, be used to create full-size images for, by way of example, a rear-projection television. It should be understood, however, that a multi-array SLM device may be used in applications where the aspect ratio of the addressable arrays and the aspect ratio of the output image are less (or more) than that of a standard aspect ratio (e.g., SXGA, HDTV-720p, HDTV-1080i, SVGA, XGA, UXGA, QXGA). An example of such an application is illustrated in FIG. 14 and the accompanying text below.

Figure 14:
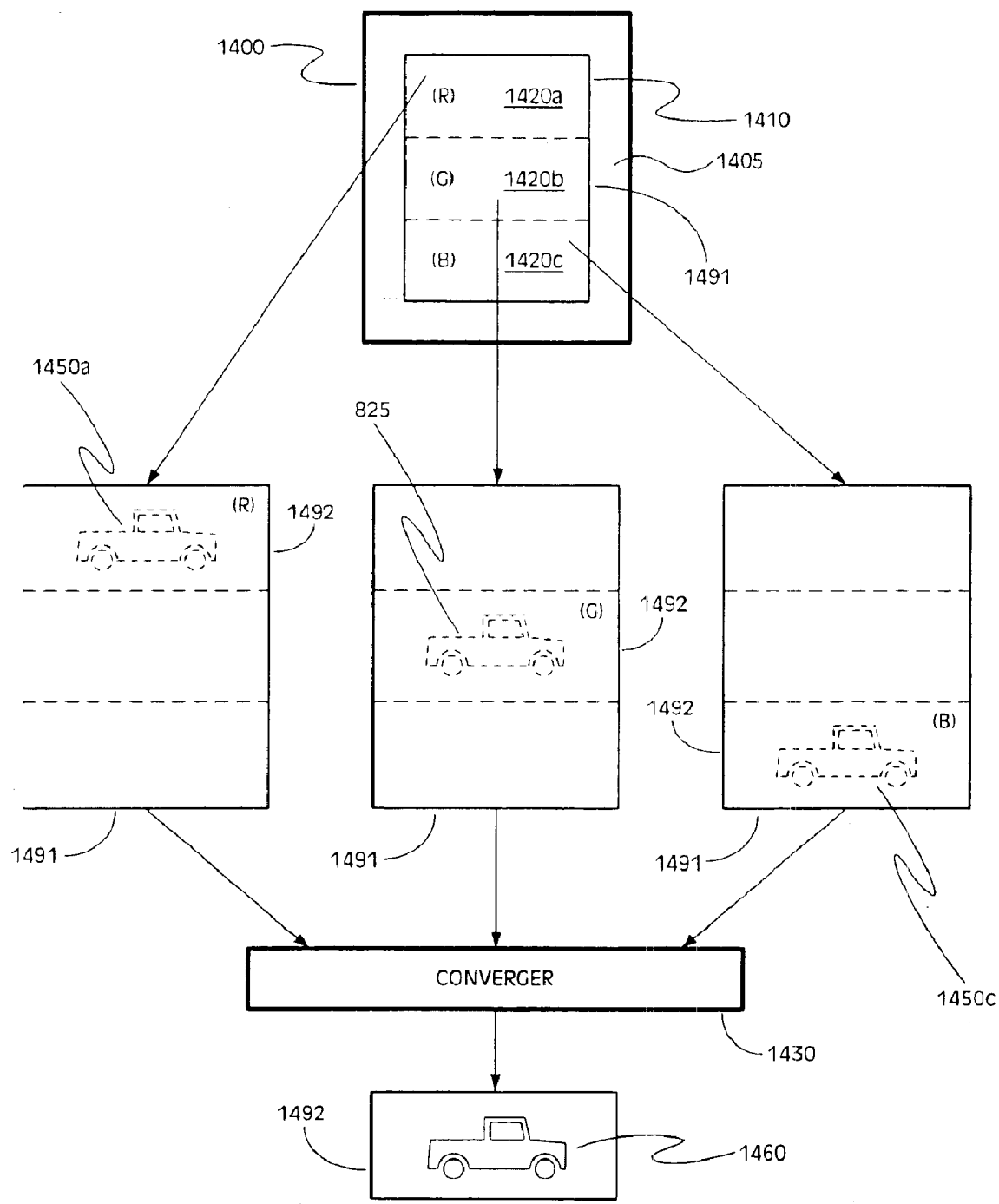
FIG. 14 is a schematic diagram illustrating another example of the method of generating an image shown in FIG. 12.

Referring to FIG. 14, illustrated is another example of the method 1200 of generating an image, wherein the multi-array SLM device 1400 comprises an addressable array of elements 1410 that has been segmented into three subarrays 1420a, 1420b, 1420c (see FIGS. 9A–9E). The aspect ratio 1491 of the addressable array 1410 is the same, or nearly the same, as that of a standard display application. For example, the addressable array of elements 1410 may include an addressable array of 1,280 by 720 elements or pixels providing a 16:9 aspect ratio (e.g., for HDTV-720p applications), an array of 1,920 by 1,080 elements also providing a 16:9 aspect ratio (e.g., for HDTV-1080i applications), an array of 800 by 600 elements providing a 4:3 aspect ratio (e.g., for SVGA applications), an array of 1,024 by 768 elements providing a 4:3 aspect ratio (e.g., for XGA applications), an array 1,600 by 1,200 elements providing a 4:3 aspect ratio (e.g., for UXGA applications), an array of 2,048 by 1,536 elements also providing a 4:3 aspect ratio (e.g., for QXGA applications), or an array of 1,280 by 1,024 elements providing a 5:4 aspect ratio (e.g., for SXGA applications). It should be understood that the aspect ratio 1491 of the addressable array 1410 may be a non-standard aspect ratio.

Each of the subarrays 1420a–c is capable of receiving (or emitting) light of one color and producing an image of that color. By way of example, as illustrated in FIG. 14, the subarray 1420a may receive (or emit) red (R) light, the subarray 1420b may receive (or emit) green (G) light, and the subarray 1420c may receive (or emit) blue (B) light. The three subarrays 1420a–c are generally of equal, or approximately equal, size.

By appropriate modulation, the subarray 1410a creates an image 1450a in the color red (once again, this image may include gray scaling). However, because the subarray 1420a comprises approximately one-third of the addressable array 1410, the image 1450a has an aspect ratio 1492 that is one-third the aspect ratio 1491 of the addressable array 1410. Similarly, the subarray 1420b generates an image 1450b in the color green, and the subarray 1420c generates an image 1450c in the color blue, each of the images 1450b, 1450c also having the aspect ratio 1492 that is approximately one-third the aspect ratio 1491.

The three color images 1450a–c are then combined by a converger 1430 into a single image 1460. The image 1460 will have the same aspect ratio 1492 as that of each of the images 1450a–c (again, this aspect ratio 1492 being approximately one-third that of the aspect ratio 1491 of the addressable array 1410). For example, if the multi-array SLM device 1400 has an addressable array of elements 1410 providing 1,024 by 768 pixels, the image 1460 may comprise 1,024 by 256 pixels (or, alternatively, 341 by 768 pixels).

It should be noted that, for any of the embodiments illustrated in FIGS. 12 through 14, as well as for the multi-array SLM devices shown in FIGS. 2 through 11, the ordering of color on the addressable arrays of elements is arbitrary. Although, for purposes of illustration, the ordering red (R), green (G), blue (B) has been used in the figures, any suitable ordering of the color components may be employed across the addressable arrays of a multi-array SLM device. It should be further noted that, for the embodiments of FIGS. 13 and 14, the segmented SLM devices 1300, 1400 may each include any other suitable number (e.g., four) of addressable arrays or subarrays.

Illustrated in FIGS. 15A through 20 is an embodiment of an optics engine 1500 having a multi-array SLM device. In FIGS. 15A through 20, specific embodiments of a color generator 1700 and a converger 1800, respectively, are shown. The optics engine 1500 generally function in a manner similar to the optics engine 100 shown and described above with respect to FIGS. 1 through 14 and the accompanying text. However, it should be understood that the optics engine 1500 discussed below is but one example of an optics engine incorporating a multi-array SLM device, and no unnecessary limitations should be drawn from the following description. In particular, the color generator 120 and converger 130 shown in FIG. 1 (and FIGS. 3B and 3C) are not limited to the embodiments of the color generator 1700 and converger 1800, respectively, presented below. Also, any of the embodiments of a multi-array SLM device disclosed herein may be incorporated in the optics engine 1500.

Figure 15A:
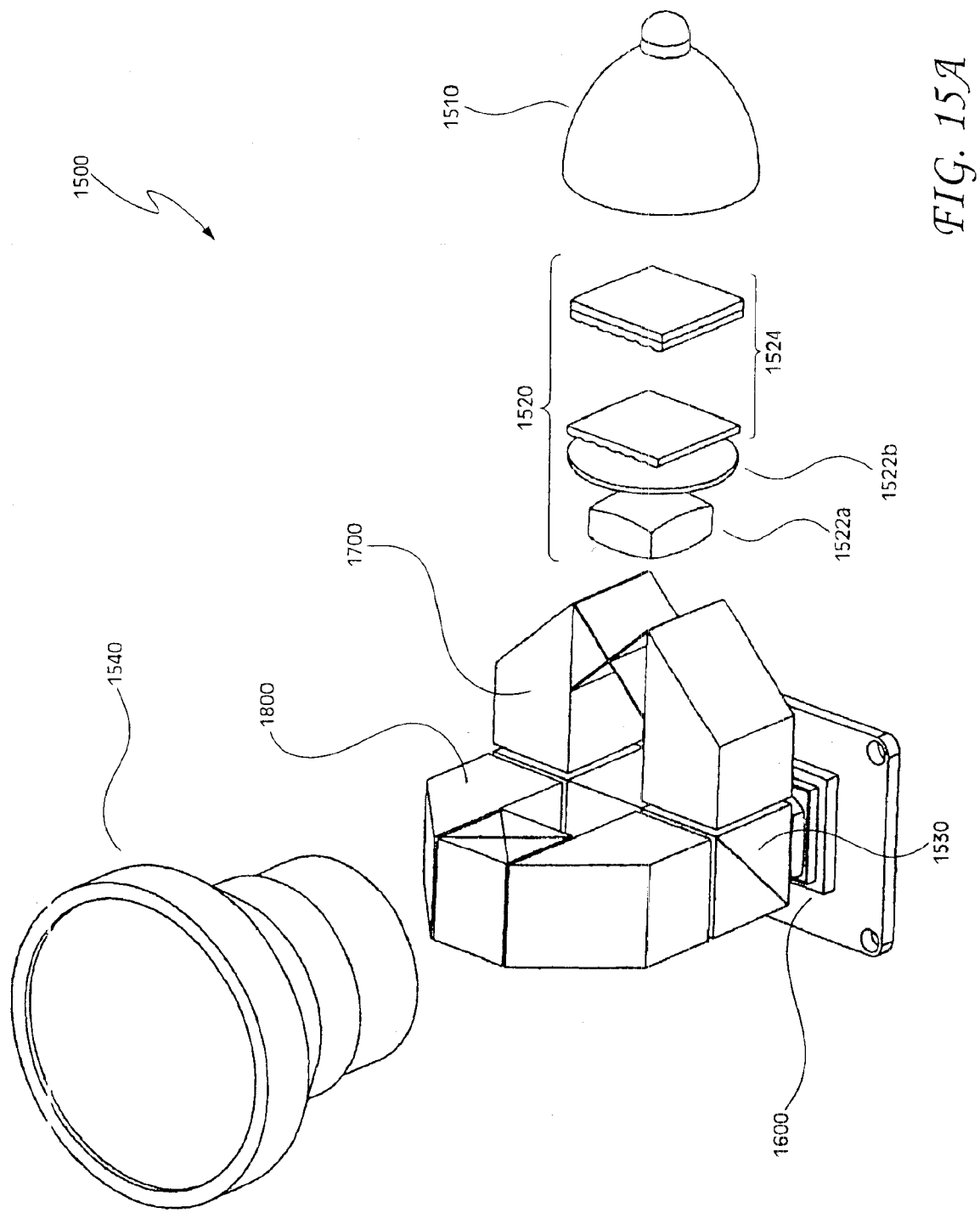
FIG. 15A is a perspective view of an embodiment of a system including a multi-array SLM device.
Figure 15B:
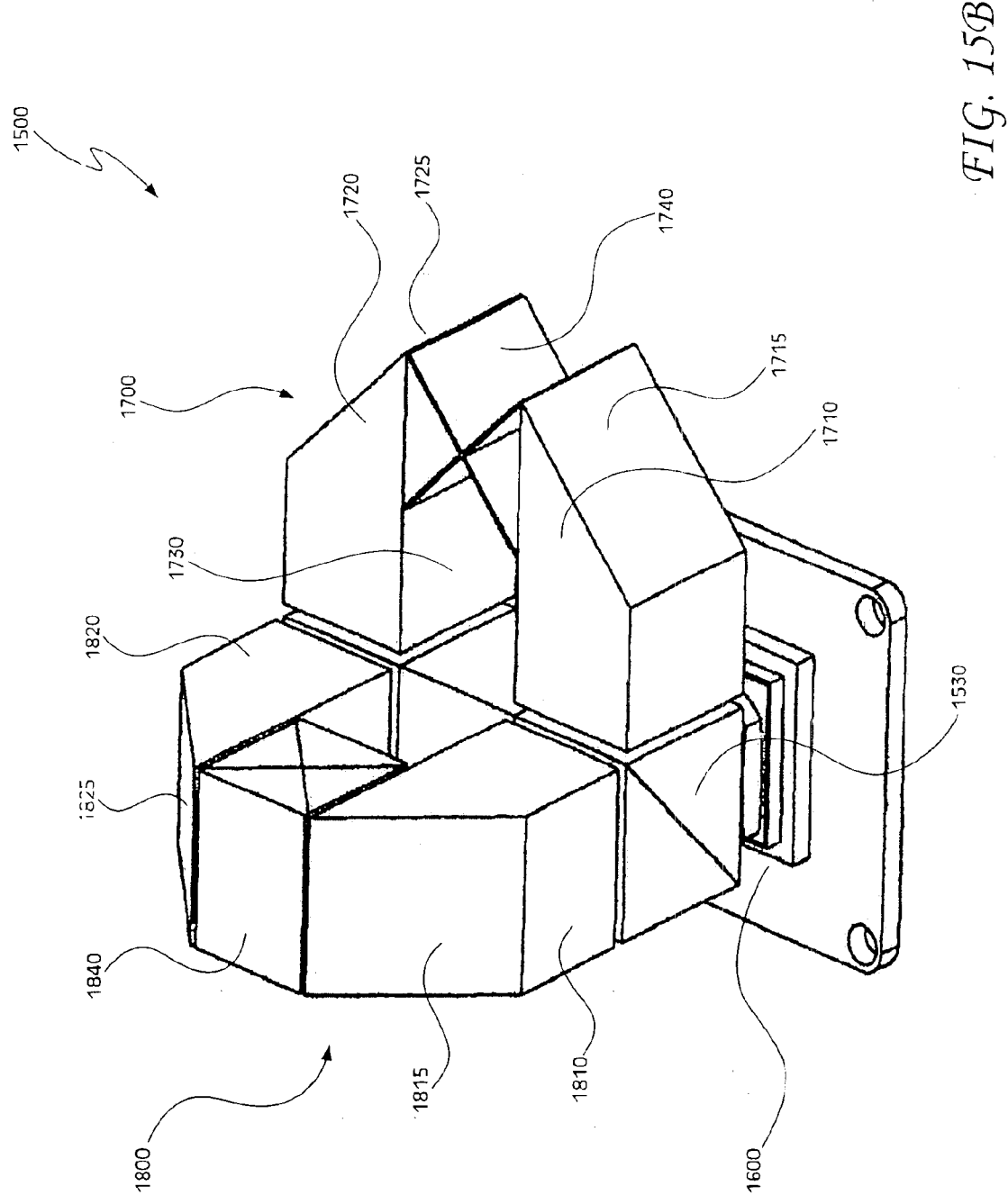
FIG. 15B is an enlarged perspective view of a portion of the system illustrated in FIG. 15A.

Referring to FIG. 15A, as well as to FIG. 15B, the optics engine 1500 includes a light source 1510, input optics 1520, a color generator 1700, a polarized beam splitter (PBS) 1530, a multi-array SLM device 1600, a converger 1800, and output optics 1540. An enlarged view of a portion of the optics engine 1500 (e.g., multi-array SLM device 1600, color generator 1700, and converger 1800) is shown in FIG. 15B. The optics engine 1500 may find application in, by way of example only, rear projection televisions, computer monitors, front projection televisions, cinema projectors, and data projectors (the latter two also typically employing front projection).

The light source 1510 may comprise any suitable lamp, bulb, or other luminescent source that provides "white" light or other polychromatic light to the color generator 1700. Generally, the light provided by light source 1510 will be non-polarized light.

The input optics 1520 may comprise any optical component or series of optical components, and the input optics 1520 may perform a variety of functions. For example, the input optics 1520 may perform polarization, focusing, beam collimation, and integration, as well as provide a uniform intensity distribution. The input optics 1520 may also reduce UV (ultra-violet) and IR (infra-red) energy (e.g., to reduce operating temperatures). Polarized light (i.e., linear polarized light in either s- or p-orientation) may be necessary for some types of multi-array SLM devices (e.g., LCOS devices and LCDs). By way of example only, the input optics 1520 may comprise one or more lenses (e.g., lenses 1522a, 1522b) and a polarization conversion system (PCS) 1524 to perform polarization, these optical components being well known in the art.

The color generator 1700 receives the light provided by light source 1510 and outputs a number of color components (e.g., the primary colors red, green, and blue). The color components are then provided to the PBS 1530, which directs the color components to the multi-array SLM device 1600. Color generator 1700 is described in greater detail below.

The PBS 1530 receives the color components from the color generator 1700, as noted above, and directs each component onto one of the addressable arrays of the multi-array SLM device 1600. Polarized beam splitters are well known in the art. In one embodiment, the PBS 1530 comprises a single element that manipulates all of the light components. In another embodiment, the PBS 1530 comprises a number of elements, each element manipulating one of the light components. It should be understood that the optics engine 1500 may utilize other optical components—e.g., a total internal reflection (TIR) prism or similar device—in place of the PBS 1530.

Figure 16:
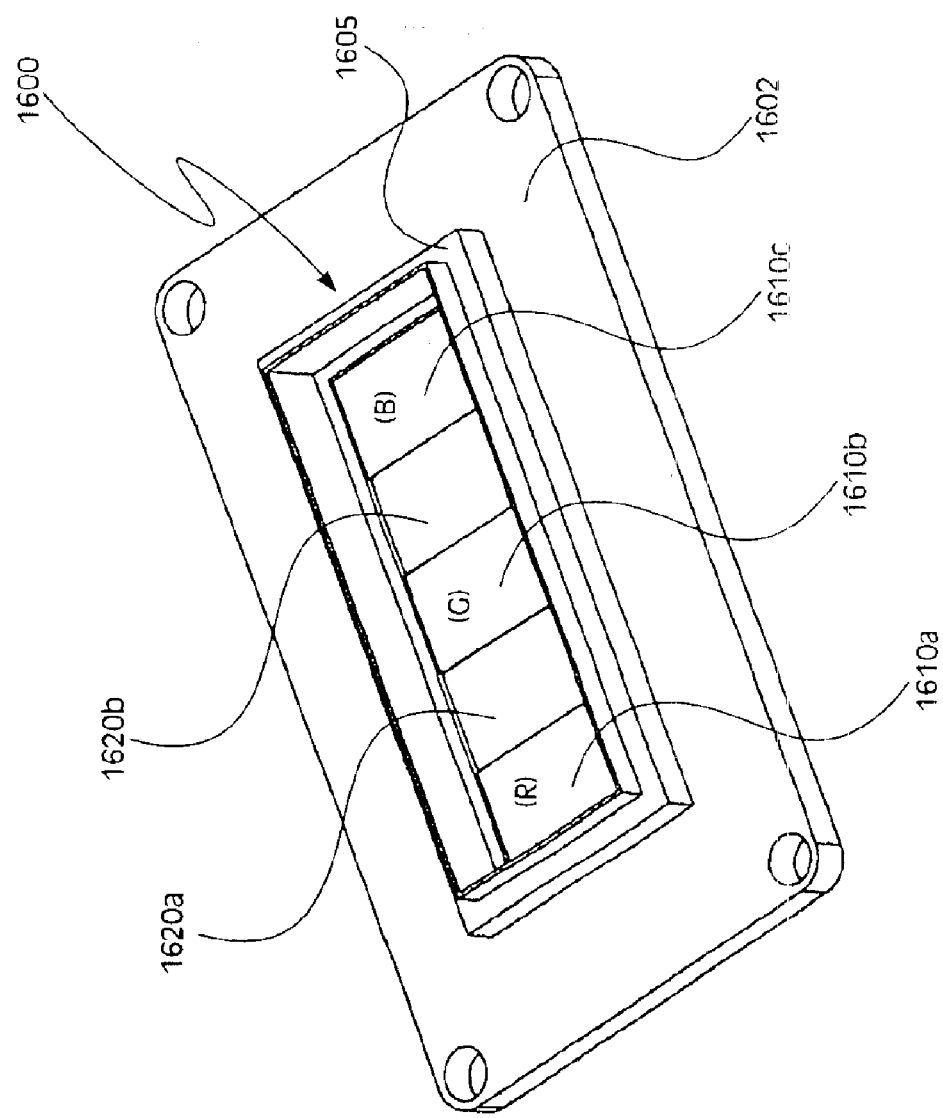
FIG. 16 is a perspective view of an embodiment of a multi-array SLM device shown in FIGS. 15A and 15B.

The multi-array SLM device 1600 is shown in FIG. 16, the illustrated SLM device 1600 being generally similar to the multi-array SLM devices 200, 300 illustrated in FIGS. 2 and 3A. However, it should be understood that the multi-array SLM device 1600 may comprise any of the embodiments of a multi-array SLM device shown and described above with respect to FIGS. I through 14. Multi-array SLM device 1600 may comprise an LCOS device, a reflective LCD, a transmissive LCD (see FIG. 21 below), an emissive device, or a micromirror device. It should be understood that, for emissive devices (e.g., OLEDs, PLEDs, and the like), the optics engine 1500 need not include a light source 1510 or a color generator 1700, and an embodiment of an optics engine including an emissive multi-array SLM device is illustrated in FIG. 22 and the accompanying text below.

Referring to FIG. 16, the multi-array SLM device 1600 includes three addressable arrays of elements 1610a, 1610b, 1610c formed or otherwise disposed on a substrate 1605. Note that the substrate 1605 may be mounted on a support plate 1602. The neighboring addressable arrays 1610a, 1610b are separated by a buffer region 1620a, and the neighboring addressable arrays 1610b, 1610c are separated by a buffer region 1620b. The buffer regions 1620a–b may each include circuitry, as described above. Each of the addressable arrays 1610a–c may receive (or emit) light of one color and, in response to the appropriate modulation signals, modulate the light component to generate an image in that color. For example, as shown in FIG. 16, the addressable array 1610a may receive (or emit) red light, the addressable array 1610b may receive (or emit) green light, and the addressable array 1610c may receive (or emit) blue light. In one embodiment, the substrate 1605 comprises a semiconductor material (e.g., for LCOS devices and micromirror devices), and in another embodiment the substrate 1605 comprises a glass material, quartz, a clear polymer material, or other suitable material (e.g., for emissive devices and reflective and transmissive LCDs).

Referring back to FIGS. 15A–B, the converger 1800 receives a number of images from the multi-array SLM device 1600—the images passing through the PBS 1530—and combines the images into a single image. Converger 1800 is described in greater detail below.

The output optics 1540 comprises any suitable optical component or combination of components (e.g., one or more lenses) capable of focusing the single image provided by the converger and directing the focused image to a display (not shown in figures). The output optics 1540 are commonly referred to as "projection optics."

Figure 17A:
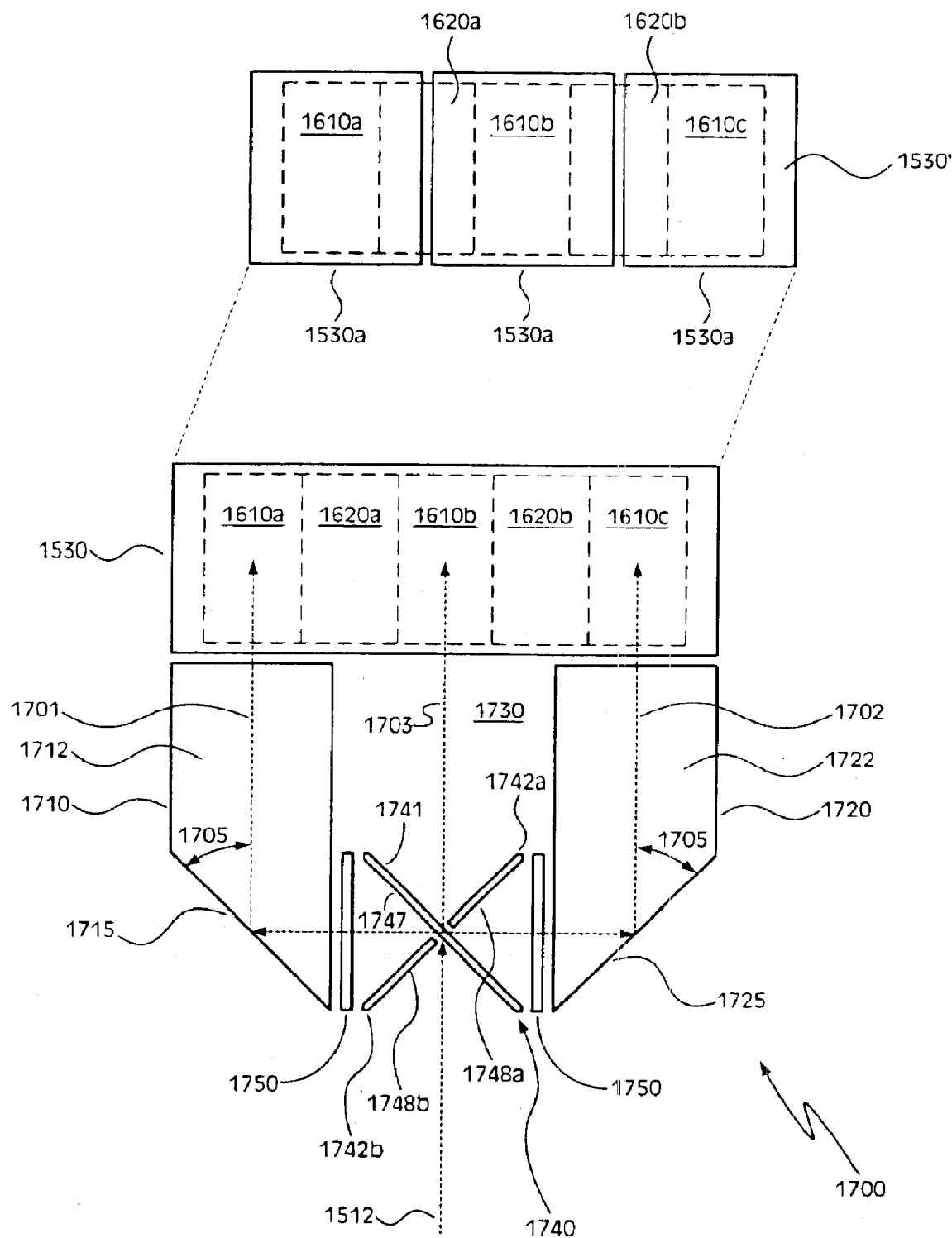
FIG. 17A is a plan view illustrating an embodiment of a color generator shown in FIGS. 15A and 15B.

Referring now to FIG. 17A in conjunction with FIG. 15B, the color generator 1700 is described in greater detail. It should be understood that the color generator 1700 would not be needed for emissive devices, such as an OLED device or a PLED device, which are capable of emitting light. Thus, an optics engine having a multi-array SLM device comprising an emissive device would generally not include the color generator 1700 (or the light source 1510).

As shown in FIGS. 17A and 15B, the color generator 1700 comprises a first element 1710, a second element 1720, a space or void 1730, and a separating device 1740. The separating device 1740 receives light 1512 from light source 1510 (again, this light may have been polarized by input optics 1520), and the separating device 1740 separates the light into three color components (e.g., red, green, and blue). The separating device 1740 may comprise any device (or devices) capable of receiving light and separating the light into a desired number of color components.

In one embodiment, as illustrated in FIGS. 15A and 17A, the separating device 1740 comprises an "X-plate." Generally, an X-plate comprises three plates oriented in two mutually orthogonal planes—i.e., oriented at ninety degrees (90°) relative to one another—each plate having a dichroic coating or comprising a dichroic mirror. Generally, a dichroic (either a mirror or coating) reflects one color of light (i.e., a certain spectral region) while transmitting other colors of light (i.e., the remaining portions of the color spectrum). For example, as shown in FIG. 17A, the X-plate 1740 comprises a first plate 1741 and second and third plates 1742a, 1742b, wherein the second and third plates 1742a–b are oriented at ninety degrees (90°) relative to the first plate 1741. Each of the plates 1741, 1742a, 1742b may be constructed of glass, quartz, a clear polymer, or other transmissive material. The first plate 1741 includes a dichroic coating (or mirror) 1747 to reflect red light and transmit green and blue light. Each of the second and third plates 1742a, 1742b includes a dichroic coating (or mirror) 1748a, 1748b, respectively, wherein each of the dichroic coatings (or mirrors) 1748a–b reflects blue light and transmits green and red light. Because of the orthogonal relationship between the first plate 1741 and the second and third plates 1742a–b, a red light component is directed toward the first element 1710, a blue light component is directed toward the second element 1720, whereas a green light component is passed through to the space 1730.

In another embodiment, the separating device 1740 comprises an "X-cube." Generally, an X-cube is similar to an X-plate; however, an X-cube comprises a cube-shaped transmissive body having two mutually orthogonal internal planes, each plane including a dichroic (either a coating or a mirror). The body of such an X-cube may be constructed of a glass material, a clear polymer material, quartz, or other suitable transmissive material. By way of example, one internal plane of an X-cube may include a first dichroic to reflect red light and transmit blue and green, and the X-cube's other internal plane may include a second dichroic to reflect blue light and transmit red and green. An X-cube is illustrated in greater detail below and, as will be explained below, an X-cube may also be used to merge individual red, green, and blue images.

In one embodiment, as shown in FIG. 17A, the first element 1710 comprises a single body 1712 constructed of glass, quartz, a clear polymer, or other transmissive material. A first optical path 1701 extends from the separating device 1740 and through the first element 1710 to a downstream component, which in this instance, is the PBS 1530. The first element 1710 is positioned and oriented to receive one of the color components (e.g., red) from the separating device 1740, and this color component is directed along the first optical path 1701 to the PBS 1530.

A surface 1715 of the first element 1710 turns the first optical path 1701 by ninety degrees (90°). The surface 1715 reflects light incident thereon—thereby turning the first optical path 1701 by ninety degrees and directing light towards the multi-array SLM device 1600—due to a property referred to as "total internal reflection." If the angle of incidence 1705 of light incident on the surface 1715 is greater than a critical angle, the incident light is totally (or at least partially) reflected. If the angle of incidence 1705 is less than the critical angle, light will pass through surface 1715. For many common optical materials (e.g., glasses and plastics), the critical angle is less than forty-five degrees (45°). Thus, if the angle of incident 1705 is equal to an angle greater than the critical angle—which, for example, may be achieved by setting the angle 1705 equal to forty-five degrees—the light component (e.g., red) propagating through first element 1710 and along first optical path 1701 is totally (or at least partially) reflected at surface 1715 and, therefore, this light component is turned by ninety degrees and is directed toward the multi-array SLM device 1600.

Figure 17B:
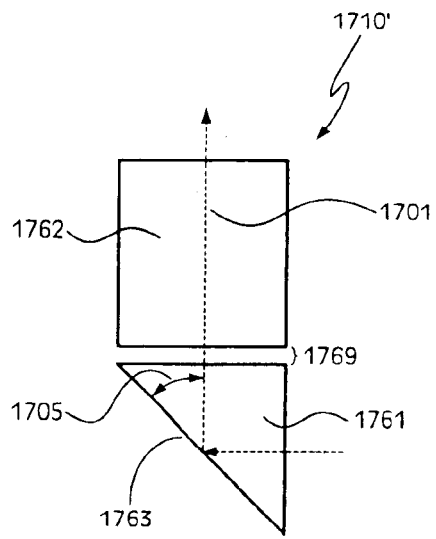
FIGS. 17B–17E each illustrate an alternative embodiment of the color generator shown in FIG. 17A.

Alternative embodiments of the first element 1710 are illustrated in each of FIGS. 17B through 17E. In one embodiment, which is shown in FIG. 17B, a first element 1710' comprise a first body 1761 and a second body 1762, each of the first and second bodies 1761, 1762 being constructed of glass, quartz, a clear polymer, or other transmissive material. The first optical path 1701 extends from the separating device 1740 and through each of the first and second bodies 1761, 1762 to a downstream component (e.g., PBS 1530). The first body 1761 has a surface 1763 oriented such that the angle of incidence 1705 is greater than the critical angle for total internal reflection. Thus, the light component (e.g., red) propagating through first body 1761 and along first optical path 1701 is reflected (either totally or partially) at surface 1763, thereby turning the first optical path by ninety degrees. The first body 1761 is often referred to as a "right angle TIR prism." An air gap 1769 may be present between the first and second bodies 1761, 1762.

Figure 17C:
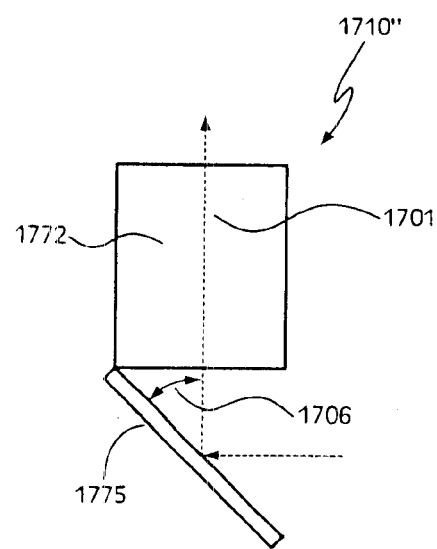

In another embodiment, which is illustrated in FIG. 17C, a first element 1710" comprises a body 1772 and a mirror 1775 disposed adjacent the body 1772. The body 1772 may be constructed of glass, quartz, a clear polymer, or other transmissive material. The first optical path 1701 extends from the separating device 1740 and toward the mirror 1775, which turns the first optical path 1701 by ninety degrees, thereby directing the first optical path into the body 1772 and to a downstream component (e.g., PBS 1530). Because a mirror 1775 is utilized to reflect incoming light, the principle of total internal reflection is not relied upon to turn the first optical path 1701, and the angle of incidence 1706 may be of any suitable angle (although, in practice, the angle of incidence 1706 will generally be set to forty-five degrees).

Figure 17D:
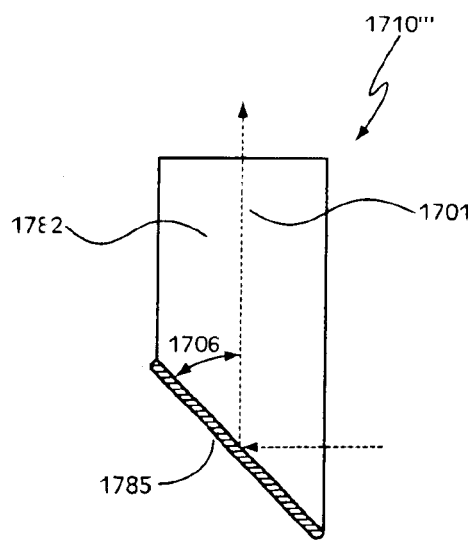

In a further embodiment, as shown in FIG. 17D, a first element 1710''' comprises a single body 1782. The body 1782 may be constructed of glass, quartz, a clear polymer, or other transmissive material. A surface 1785 of body 1782 includes a coating—e.g., a dichroic coating or other reflective coating—to reflect the light component propagating along the first optical path 1701, thereby turning the light component by ninety degrees and directing the light toward a downstream component (e.g., PBS 1530). Because a coated, reflective surface 1785 reflects light incident thereon, there is again no reliance upon the principle of total internal reflection to turn the first optical path 1701, and the angle of incidence 1706 may be of any suitable angle (as previously noted, however, the angle of incidence 1706 will, in practice, generally be set to forty-five degrees).

Figure 17E:
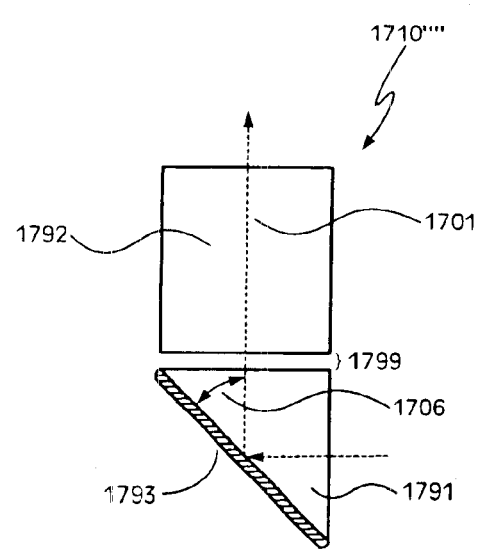

In yet another embodiment, as illustrated in FIG. 17E, a first element 1710'''' comprises a first body 1791 and a second body 1792, each of the first and second bodies 1791, 1792 being constructed of glass, quartz, a clear polymer, or other transmissive material. The first optical path 1701 extends from the separating device 1740 and through each of the first and second bodies 1791, 1792 to a downstream component (e.g., PBS 1530). A surface 1793 of first body 1791 includes a coating (e.g., a dichroic coating or other reflective coating) to reflect the light component propagating along the first optical path 1701, which turns this light component by ninety degrees and directs the light into the second body 1792. Once again, because a coated, reflective surface 1793 reflects light incident thereon, there is no reliance upon the principle of total internal reflection to turn the first optical path 1701, and the angle of incidence 1706 may be of any suitable angle (although it is typically set to forty-five degrees, as noted above). An air gap 1799 may be present between the first and second bodies 1791, 1792.

In one embodiment, the second element 1720 also comprises a single body 1722 constructed of glass, quartz, a clear polymer, or other transmissive material. A second optical path 1702 extends from the separating device 1740 and through the second element 1720 to a downstream component (e.g., the PBS 1530). The second element 1720 is positioned and oriented to receive one of the color components (e.g., blue) from the separating device 1740, and this color component is directed along the second optical path 1702 to the PBS 1530.

For the embodiment of second element 1720 shown in FIG. 17A, the second element 1720 generally functions in a manner similar to that of the first element 1710, as described above. The second element 1720 has a surface 1725 that is oriented to provide an angle of incidence 1705 greater than the critical angle, such that the surface 1725 reflects all (or a portion) of the incident light, thereby turning the second optical path 1702 by ninety degrees. In other embodiments, the second element 1720 may comprise any one of the embodiments shown and described with respect to FIGS. 17B through 17E.

Generally, the first and second elements 1710, 1720 constructed of the same material; however, in another embodiment, the first and second elements 1710, 1720 are constructed of different materials. Also, a shown in FIGS. 15A, 15B, and 17A, the first and second elements 1710, 1720 generally have the same size and configuration, although they are oriented in a mirror-image relationship. However, in a further embodiment, the first element 1710 has one size and/or configuration, whereas the second element 1720 has a different size and/or configuration.

The space or void 1730 will typically be filled with or include air. However, in another embodiment, the void 1730 may include another gas and, in a further embodiment, a vacuum may be maintained in this space. A third optical path 1703 extends from the separating device 1740 and through the space 1730 to a downstream component (e.g., the PBS 1530). The void 1730 is dimensioned and configured to receive one of the color components (e.g., green) from separating device 1740, and this color component is directed along the third optical path 1703 to PBS 1530.

As can be observed from FIG. 17A, the physical lengths of the three optical paths 1701, 1702, 1703 between the separating device 1740 and the downstream PBS 1530 are not equal. In particular, for the embodiment illustrated in FIG. 17A, the first and second optical paths 1701, 1702 are equal (or nearly equal); however, the third optical path 1703 is not equal in length to the first and second optical paths 1701, 1702.

Generally, in order to insure convergence of the images provided by SLM device 1600 and, further, to facilitate the design of suitable projection optics 1540, the color components should traverse paths of equal (or nearly equal) "optical length" within optics engine 1500. The color generator 1700 utilizes the differences in optical characteristics between the void, which is typically air, and the material (e.g., glass) of the first and second elements 1710, 1720 to equalize the optical lengths of the first, second, and third optical paths. More specifically, by appropriate selection of materials (e.g., glass and air) and taking into account the difference in the index of refraction between these materials, and through careful selection of the size and configuration of the first and second elements 1710, 1720 as well as space 1730, the first, second, and third optical paths 1701, 1702, 1703 can have equal optical lengths (as distinguished from physical length). For optical paths 1701, 1702, 1703 of equal optical length, light propagating along these optical paths, respectively, will come into focus at the same point or plane (e.g., at PBS 1530 or multi-array SLM device 1600).

In another embodiment, color generator 1700 includes wave plates 1750. One of the wave plates 1750 is disposed between the separating device 1740 and the first element 1710, and the other wave plate 1750 is disposed between the separating device 1740 and the second element 1720. Generally, a wave plate comprises a device capable of changing the orientation—i.e., by ninety degrees (90°)—of polarized light.

In one embodiment, the first element 1710, second element 1720, and separating device 1740 (and wave plates 1750, if present) are simply mounted or fixtured adjacent to one another. In a further embodiment, the first and second elements 1710, 1720 and separating device 1740 (and wave plates 1750, if included) are attached to one another to form a single component. In another embodiment, this single component is also attached to the PBS 1530 and, in yet a further embodiment, the color generator 1700, PBS 1530, and converger 1800 are attached to one another to form one part.

It should be understood that, in practice—due to design and manufacturing tolerances, variations in material properties, as well as other factors—the optical paths 1701, 1702, 1703 may not have precisely equal optical lengths. Thus, as used herein, the terms "equal", "equivalent", and "same" should not be limited to meaning precisely the same or mathematical equivalence. Rather, each of these terms should encompass a broad range of meaning, ranging from the situation where two or more quantities are precisely the same or mathematically equal to the situation where two or more quantities are substantially equivalent or nearly the same.

Figure 19:
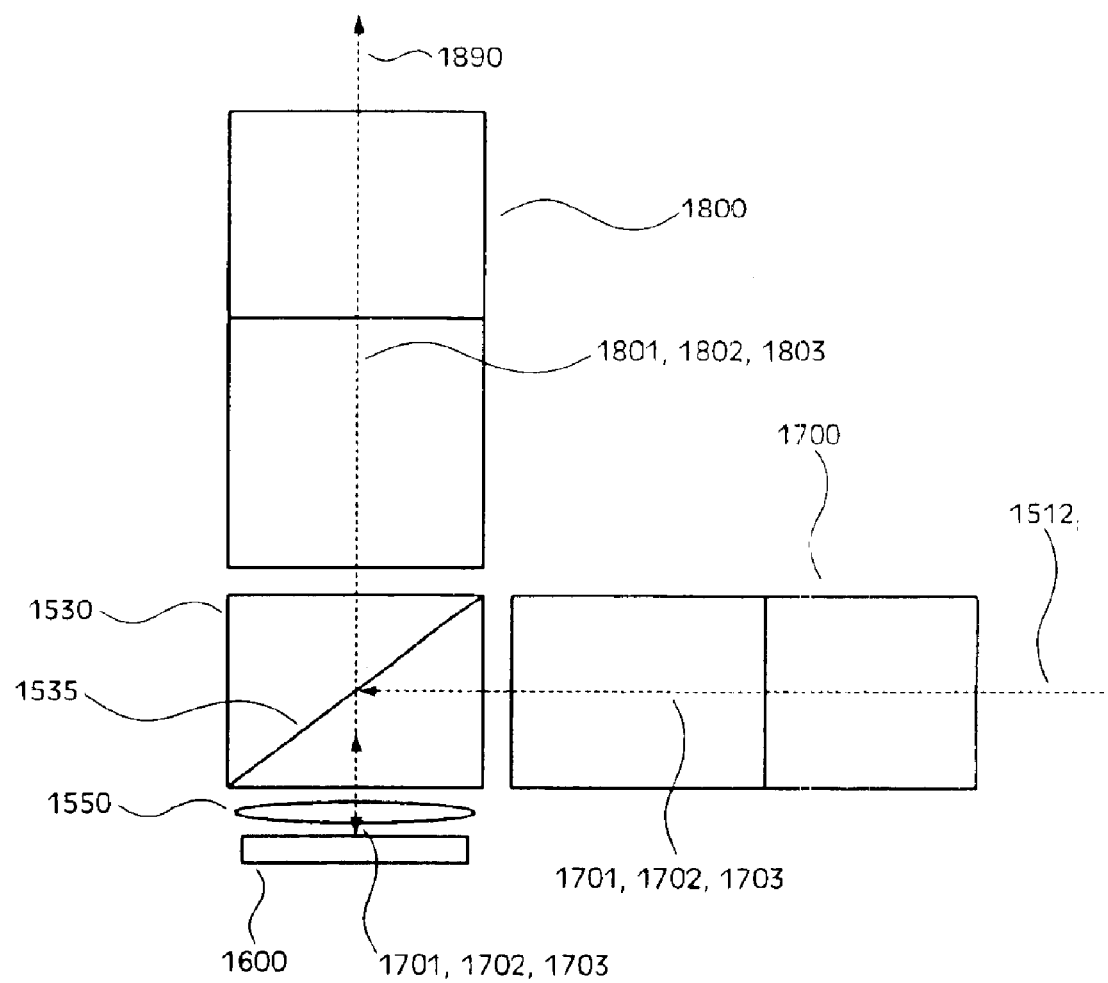
FIG. 19 is a side elevation view illustrating the color generator and converger shown in FIGS. 17 and 18.

The PBS 1530 will direct each of the color components it receives onto one of the addressable arrays 1610a–c of multi-array SLM device 1600. This is illustrated more clearly in FIG. 19, which shows a side elevation view of the PBS 1530, as well as color generator 1700 and converger 1800. Referring to FIG. 19, the PBS 1530 includes an internal plane 1535 having a mirror or reflective coating disposed thereon to direct each of the color components traveling over optical paths 1701, 1702, 1703 onto an addressable array 1610a–c of multi-array SLM device 1600. For example, the red color component traverses the first optical path 1701 and is directed to the addressable array 1610a, the blue color component traverses the second optical path 1702 and is directed to the addressable array 1610c, and the green color component traverses the third optical path 1703 and is directed to the addressable array 1610b. The images provided by the multi-array SLM device 1600 also pass through the PBS 1530 and to the optical paths 1801, 1802, 1803 of converger 1800. Note that the orientation of the PBS plane 1535 is such that light polarized in one direction (either 's' or 'p') is reflected at this plane (i.e., the individual color components), whereas light polarized in the orthogonal direction (either 's' or 'p') is allowed to pass through the plane (i.e., the individual images). Again, other optical components may perform this input/output light discrimination, and such a component (e.g., a TIR prism) may also be used in optics engine 1500 in lieu of a PBS 1530.

As noted above, in one embodiment, the PBS 1530 comprises a single element. In an alternative embodiment, which is illustrated in FIG. 17A, a PBS 1530' comprises three separate elements 1530a, 1530b, 1530c. Each of the three elements 1530a–c directs one of the color components onto one of the addressable arrays 1610a–c. The images generated by multi-array SLM device 1600 will also pass through the PBS 1530' to converger 1800.

Figure 18:
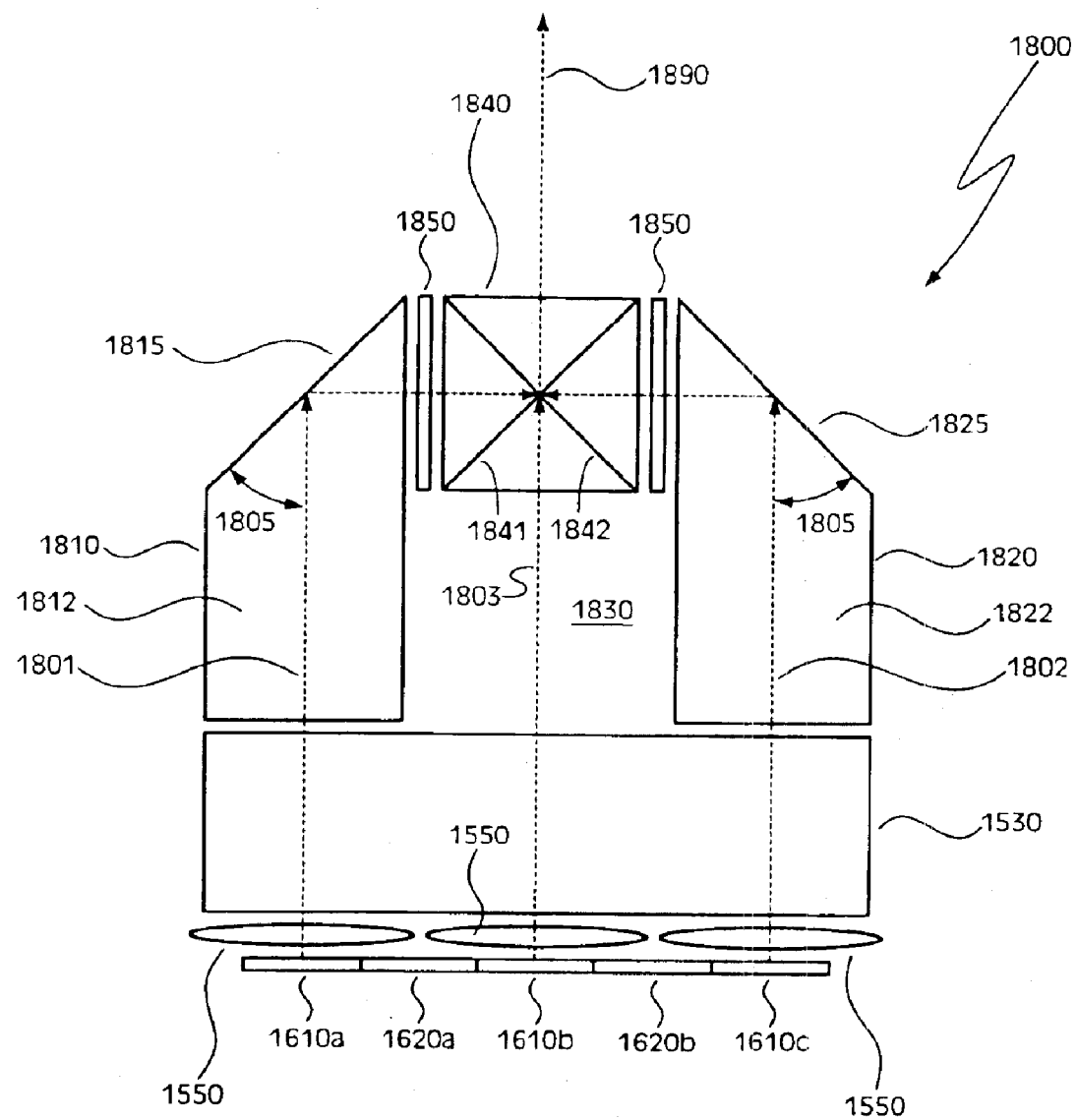
FIG. 18 is an front elevation view illustrating an embodiment of a converger shown in FIGS. 15A and 15B.

Referring to FIG. 18 in conjunction with FIG. 15B, the converger 1800 comprises a first element 1810, a second element 1820, a space or void 1830, and a combining device 1840. The converger 1800 receives from PBS 1530 a number of images (e.g., red, green, and blue) generated by the multi-array SLM device 1600, and the converger 1800 combines the images into a single image. It should be noted that, in the embodiment illustrated in FIGS. 15A through 20, the color generator 1700 and converger 1800 are essentially mirror images of one another, although the color generator 1700 utilizes an X-plate as the separating device 1740 and, as will be explained below, the converger 1800 utilizes an X-cube as the combining device 1840.

The first element 1810 comprises a body 1812 constructed of glass, quartz, a clear polymer, or other transmissive material. A first optical path 1801 extends from an upstream component—which, in this instance, is the PBS 1530—and through the first element 1810 to the combining device 1840. The first element 1810 is positioned and oriented to receive one of the images (e.g., red) from the PBS 1530, and this color component is directed along the first optical path 1801 to the combining device 1840.

The converger may also employ the principle of total internal reflection. A surface 1815 of first element 1810 may be oriented such that the angle of incidence 1805 is greater than the critical angle (e.g., an angle of incidence of forty-five degrees). Thus, the image (e.g., red) propagating through first element 1810 and along first optical path 1801 is totally (or at least partially) reflected at surface 1815, thereby turning this image by ninety degrees and directing the image toward the combining device 1840. In other embodiments, the first element 1810 of converger 1800 may comprise any one of the embodiments shown and described with respect to FIGS. 17B through 17E.

In one embodiment, the second element 1820 also comprises a single body 1822 constructed of glass, quartz, a clear polymer, or other transmissive material. A second optical path 1802 extends from an upstream component (e.g., the PBS 1530) and through the second element 1820 to the combining device 1840. The second element 1820 is positioned and oriented to receive one of the images (e.g., blue) from the PBS 1530, and this color component is directed along the second optical path 1802 to the combining device 1840.

In the embodiment of FIG. 18, the second element 1820 generally functions in a manner similar to that of the first element 1810, as previously described. The second element 1820 has a surface 1825 that is oriented to provide an angle of incidence 1805 greater than the critical angle, such that the surface 1825 reflects all (or a portion) of the incident light. Accordingly, the image (e.g., blue) propagating through second element 1820 and along second optical path 1802 is turned by ninety degrees, and this image is then directed toward the combining device 1840. In other embodiments, the second element 1820 may comprise any one of the embodiments shown and described with respect to FIGS. 17B through 17E.

Generally, the first and second elements 1810, 1820 are constructed of the same material; however, in another embodiment, the first and second elements 1810, 1820 are constructed of different materials. Also, a shown in FIGS. 15A, 15B, and 18, the first and second elements 1810, 1820 generally have the same size and configuration, although they are oriented in a mirror-image relationship. However, in a further embodiment, the first element 1810 has one size and/or configuration, whereas the second element 1820 has a different size and/or configuration.

The space or void 1830 will typically be filled with or include air. However, in another embodiment, the void 1830 may include another gas and, in a further embodiment, a vacuum may be maintained in this space. A third optical path 1803 extends from an upstream component (e.g., the PBS 1530) and through the void 1830 to the combining device 1840. The void 1830 is dimensioned and configured to receive one of the images (e.g., green) from the PBS 1530, and this color component is directed along the third optical path 1803 to the combining device 1840.

The combining device 1840 comprises any device (or devices) capable of receiving a number of images and combining, or converging, the images to form a single image. In one embodiment, the combining device 1840 comprises an X-cube, as described. The X-cube can receive individual red, green, and blue images and merge the images into a single image. The X-cube may comprise a cube-shaped body constructed of glass or other transmissive material having a first internal plane 1841 and a second internal plane 1842, the first and second planes 1841, 1842 being mutually orthogonal. The first plane 1841 includes a first dichroic coating (or mirror) to reflect red light and transmit green and blue, and the second plane 1842 includes a second dichroic coating (or mirror) to reflect blue light and transmit red and green. Typically, to form the cube-shaped body including these internal planes 1841, 1842, the X-cube is constructed of a number of parts (e.g., four wedged-shaped parts having dichroic mirrors or coatings formed on surfaces thereof) that are attached to one another. In another embodiment, the combining device 1840 comprises an X-plate, as previously described.

As can be observed from FIG. 18, the physical lengths of the three optical paths 1801, 1802, 1803 between upstream PBS 1530 and the combining device 1840 are not equal. In particular, for the embodiment illustrated in FIG. 18, the first and second optical paths 1801, 1802 are equal (or nearly equal); however, the third optical path 1803 is not equal in length to the first and second optical paths 1801, 1802. Generally, in order to insure convergence of the images provided by SLM device 1600 and, further, to facilitate the design of suitable projection optics 1540, the images should traverse paths of equal (or nearly equal) "optical length" within optics engine 1500, as noted above.

In a manner similar to color generator 1700, the converger 1800 also utilizes the differences in optical characteristics between the void, which is typically air, and the material (e.g., glass) of the first and second elements 1810, 1820. More specifically, by appropriate selection of materials (e.g., glass and air) and taking account the difference in the index of refraction between these materials, and through careful selection of the size and configuration of the first and second elements 1810, 1820 as well as space 1830, the first, second, and third optical paths 1801, 1802, 1803 can have equal optical lengths (as distinguished from physical length). Thus, the images (e.g., red, blue, green) propagating along the optical paths 1801, 1802, 1803, respectively, will come into focus at the same point or plane (e.g., combining device 1840).

In another embodiment, converger 1800 includes wave plates 1850. One of the wave plates 1850 is disposed between the first element 1810 and the combining device 1840, and the other wave plate 1850 is disposed between the second element 1820 and the combining device 1840. Generally, as set forth above, a wave plate comprises a device capable of changing the orientation—i.e., by ninety degrees (90°)—of polarized light.

In one embodiment, the first element 1810, second element 1820, and combining device 1840 (and wave plates 1850, if present) are simply mounted or fixtured adjacent to one another. In a further embodiment, the first and second elements 1810, 1820 and combining device 1840 (and wave plates 1850, if included) are attached to one another to form a single component. In yet another embodiment, this single component is also attached to the PBS 1530. Also, in yet a further embodiment, as noted above, the converger 1800, PBS 1530, and color generator 1700 may be attached to one another to form one part.

It should be understood that, in practice—due to design and manufacturing tolerances, variations in material properties, as well as other factors—the optical paths 1801, 1802, 1803 may not have precisely equal optical lengths. Thus, once again, as used herein, the terms "equal", "equivalent", and "same" should not be limited to meaning precisely the same or mathematical equivalence. Rather, each of these terms should encompass a broad range of meaning, ranging from the situation where two or more quantities are precisely the same or mathematically equal to the situation where two or more quantities are substantially equivalent or nearly the same.

In another embodiment of optics engine 1500, which is illustrated in FIGS. 18 and 19, three field lenses 1550 are disposed between the PBS 1530 and the multi-array SLM device 1600. Each of the field lenses 1550 is disposed between the PBS 1530 and one of the addressable arrays 1610*a–c* of the multi-array SLM device 1600. The field lenses 1550 minimize light divergence and insure that light traveling between the PBS 1530 and SLM device 1600 is confined to its path, thereby increasing light throughput.

Figure 20:
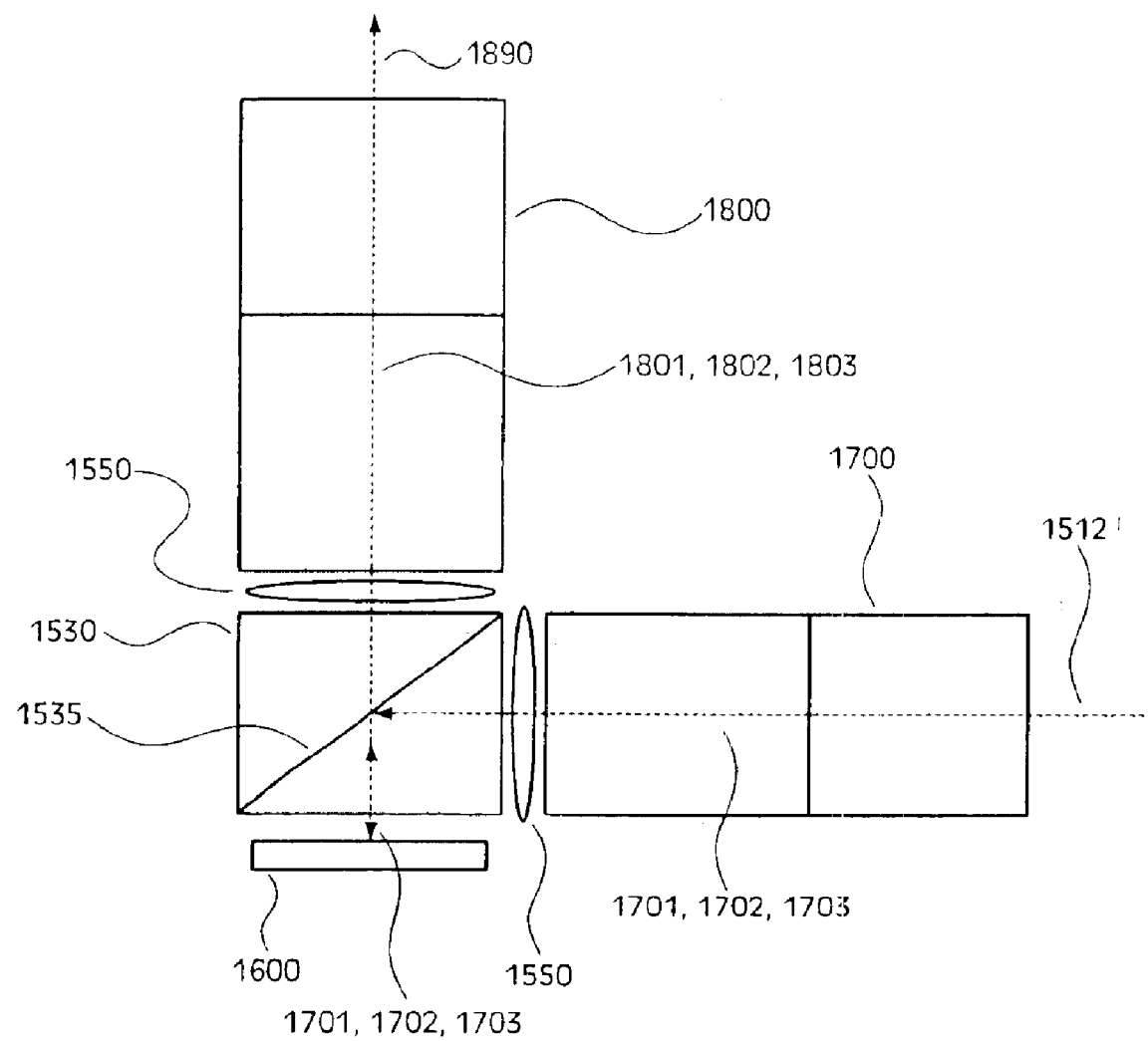
FIG. 20 is a side elevation view illustrating an alternative embodiment of the apparatus shown in FIG. 19.

In a further embodiment of optics engine 1500, as illustrated in FIG. 20, three field lenses 1550 are disposed between the color generator 1700 and the PBS 1530, and three additional field lenses 1550 are disposed between the PBS 1530 and the converger 1800. Disposing field lenses 1550 on both the upstream and downstream side of the PBS 1530 may provide greater adjustability and may also help to correct for birefringence.

Figure 21:
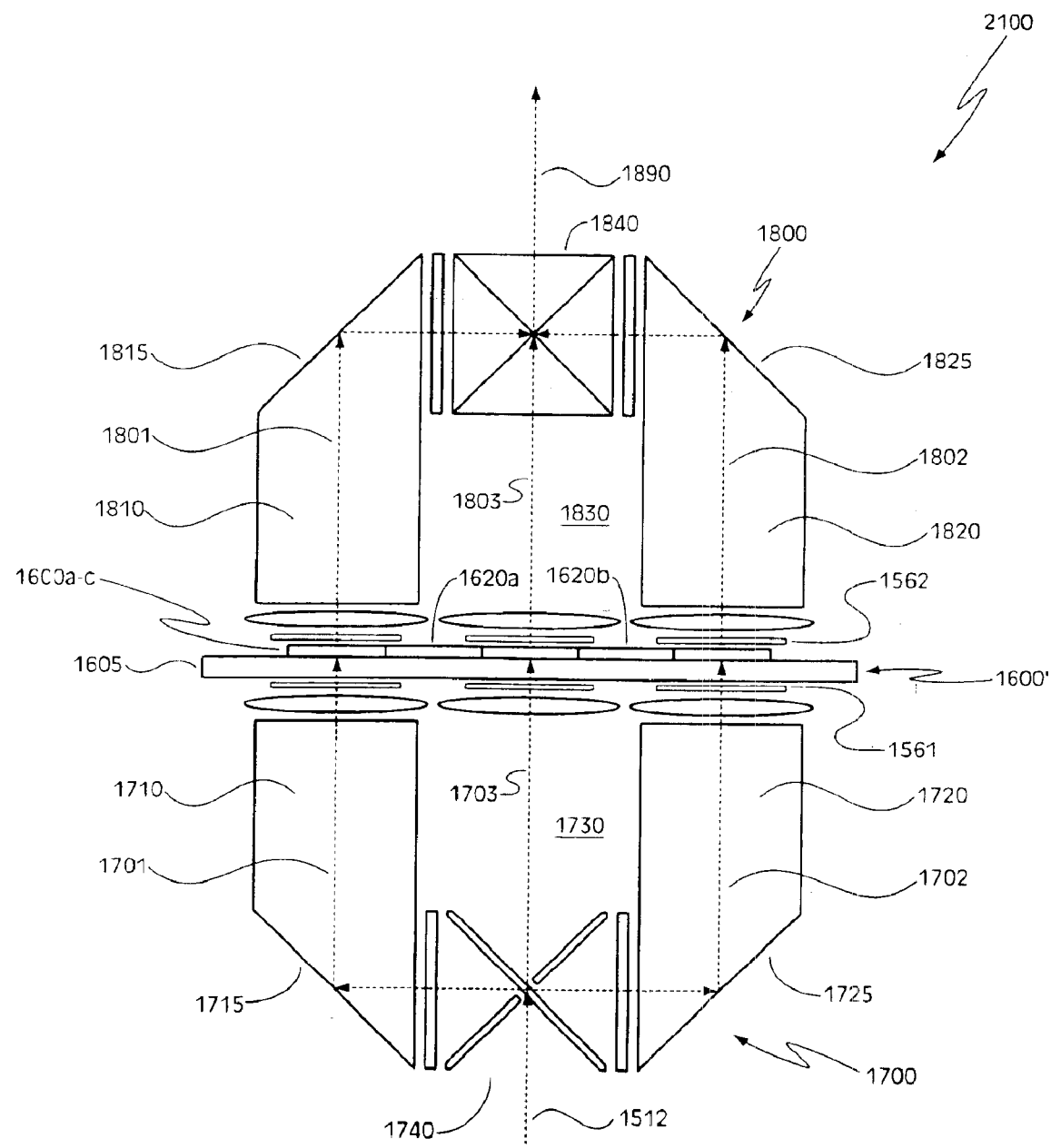
FIG. 21 is an elevation view illustrating an embodiment of a system having a multi-array transmissive LCD.
Figure 22:
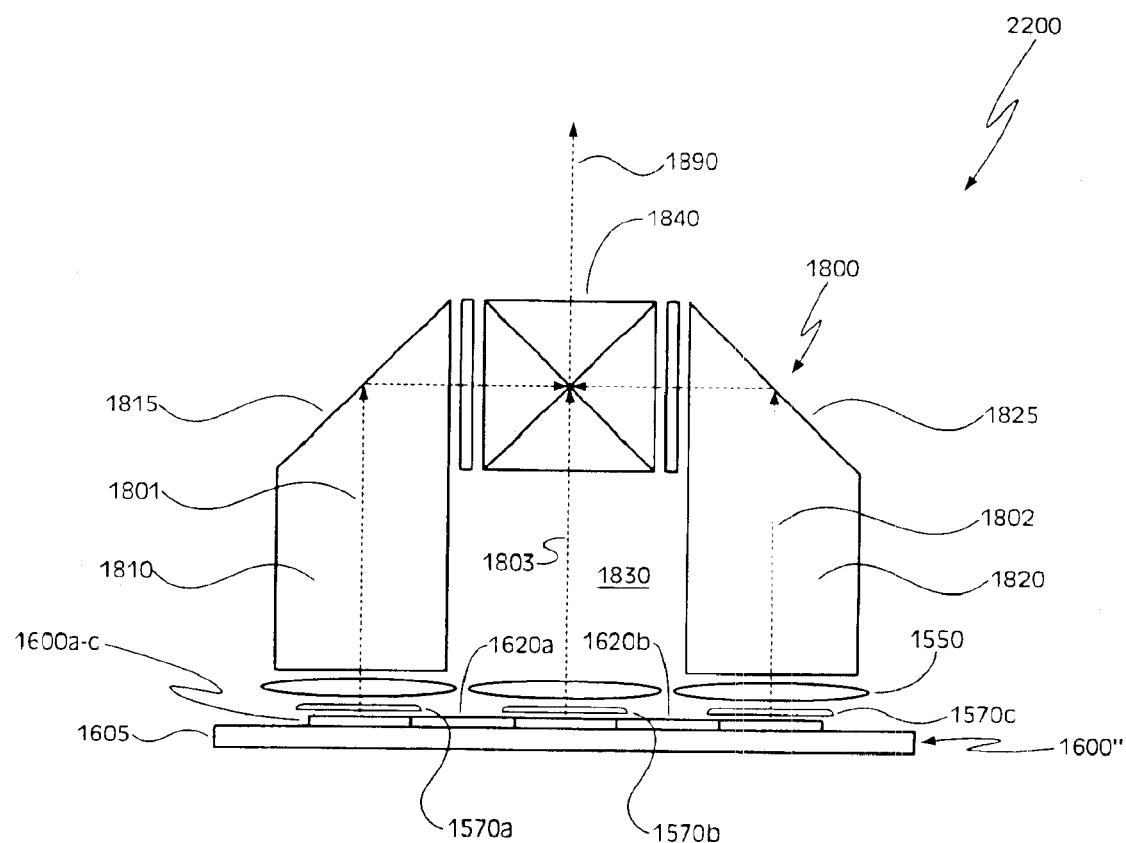
FIG. 22 is an elevation view illustrating an embodiment of a system having a multi-array OLED device.

Illustrated in FIG. 21 is portion of another embodiment of an optics engine 2100 (light source, input optics, and output optics not shown). The optics engine 2100 includes the color generator 1700 (as described above), a multi-array SLM device 1600', and the converger 1800 (also as described above). The optics engine 2100 functions in a manner similar to that described above for optics engine 1500 (as well as optics engine 100). However, the multi-array SLM device 1600' comprises a transmissive LCD having a number of addressable arrays of elements 1610*a–c* formed or disposed on a transmissive substrate 1605 (e.g., glass or quartz). The addressable arrays 1610*a–c* are separated by buffer regions 1620*a*, 1620*b* (which may have devices or circuitry disposed thereon), as described above.

For the optics engine 2100 of FIG. 21, the color generator 1700 is disposed on one side of the transmissive LCD 1600', and the converger 1800 is disposed adjacent an opposing side thereof. A PBS 1530 or other similar device (e.g., a TIR prism) is, therefore, unnecessary. Thus, one color component (e.g., red) travels along the first optical path 1701 of color generator 1700 to the transmissive LCD, and the corresponding image (i.e., red) travels along the first path 1801 of converger 1800. The first optical paths 1701, 1801 of the color generator and converger 1700, 1800, respectively, are generally collinear between the surfaces 1715, 1815. The second optical paths 1702, 1802 of the color generator 1700 and converger 1800, respectively, are similarly collinear between the surfaces 1725, 1825, and the third optical paths 1703, 1803 of these two components are also collinear between the separating device 1740 and the combining device 1840.

As illustrated in FIG. 21, an input polarizing device 1561 may be disposed within each of the optical paths 1701, 1702, 1703 between the color generator 1700 and the multi-array SLM device 1600', and an output polarizing device 1562 may be disposed within each of the optical paths 1801, 1802, 1803 between the multi-array SLM device 1600' and the converger 1800. Generally, the input polarizers 1561 and the output polarizers 1562 are crossed—i.e., oriented at ninety degrees relative to one another—with respect to each other (the output polarizing devices 1562 often being referred to as "analyzers"). Also, field lenses 1550 may be disposed at both the upstream and downstream sides of the multi-array SLM device 1600'.

Referring now to FIG. 22, another embodiment of an optics engine 2200 is illustrated (output optics not shown). The optics engine 2200 includes a multi-array SLM device 1600" comprising an emissive device, such as an OLED device, a PLED device, an EL display, a PDP, an FED, or a VFD. The emissive device has a number of addressable arrays of elements 1610a–c formed or disposed on a substrate 1605 (e.g., glass, quartz, plastic). The addressable arrays 1610a–c are separated by buffer regions 1620a, 1620b (which may have devices or circuitry disposed thereon), as described above. Each of the addressable arrays 1610a–c is capable of producing an image, and the images generated by the addressable arrays 1610a–c are provided to the converger 1800, which then combines the images into a single image (as previously described). The optics engine 2200 functions in a manner similar to that set forth above for optics engine 1500 (as well as optics engine 100). However, it should be understood that the emissive device emits light and, therefore, a separate light source (e.g., light source 110 or light source 1510), a color generator (e.g., color generator 120 or color generator 1700), as well as a PBS 1530 or similar device, are not needed.

In one embodiment, each of the addressable arrays 1610a–c of the emissive device is capable of emitting light of the appropriate color (e.g., addressable array 1610a emits red light, addressable array 1610b emits green light, and addressable array 1610c emits blue light). In another embodiment, as shown in FIG. 22, one or more color filters is disposed between the emissive device and the converger 1800. For example, as illustrated, a first color filter 1570a (e.g., allowing red light to pass) is disposed over the addressable array 1610a, a second color filter 1570b (e.g., allowing green light to pass) is disposed over the addressable array 1610b, and a third color filter 1570c (e.g., allowing blue light to pass) is disposed over the addressable array 1610c. Also, field lenses 1550 may be disposed between the emissive device and the converger 1800, which lenses function as described above.

Figure 23A:
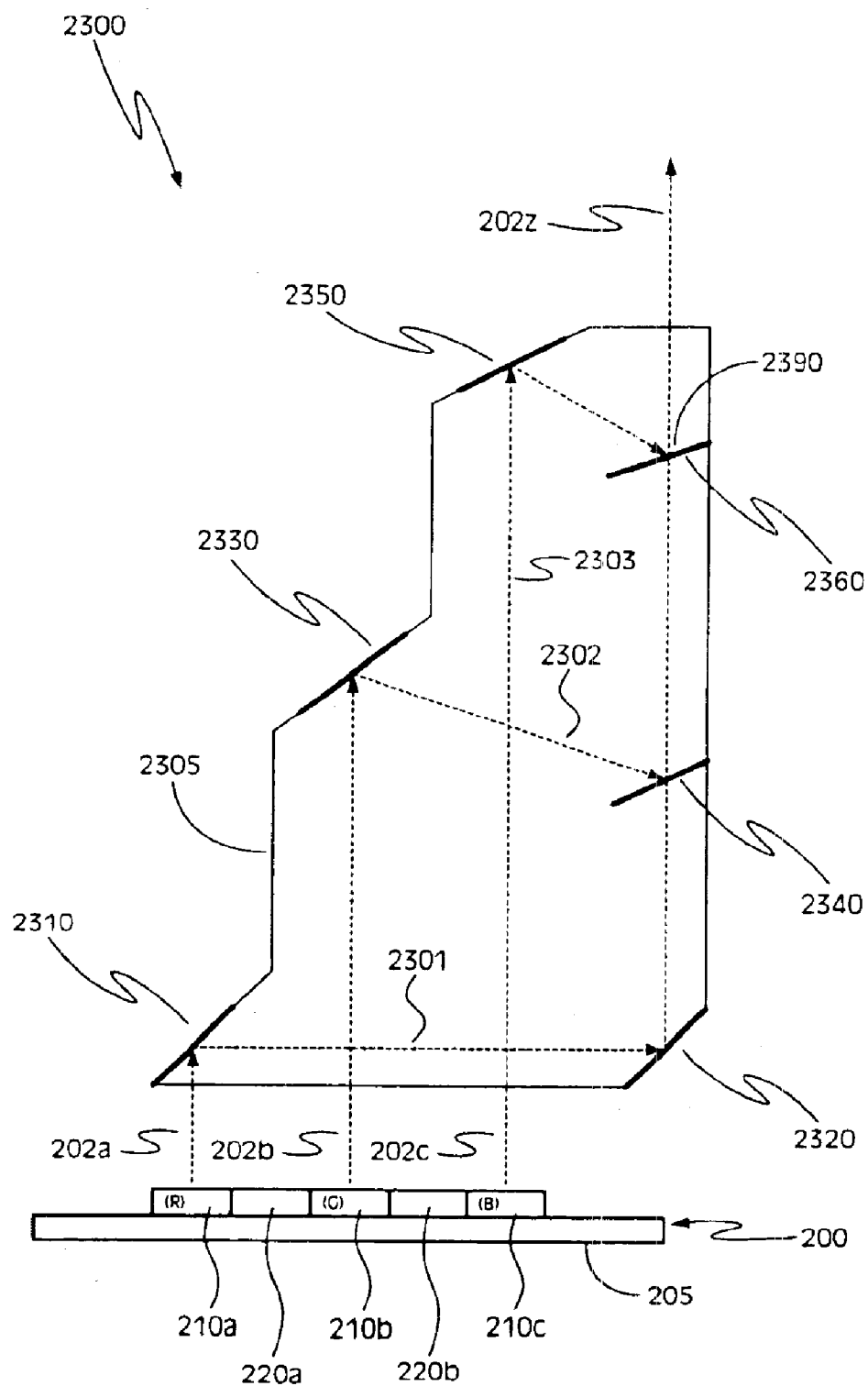
FIG. 23A is a side elevation view illustrating another embodiment of a converger.
Figure 23B:
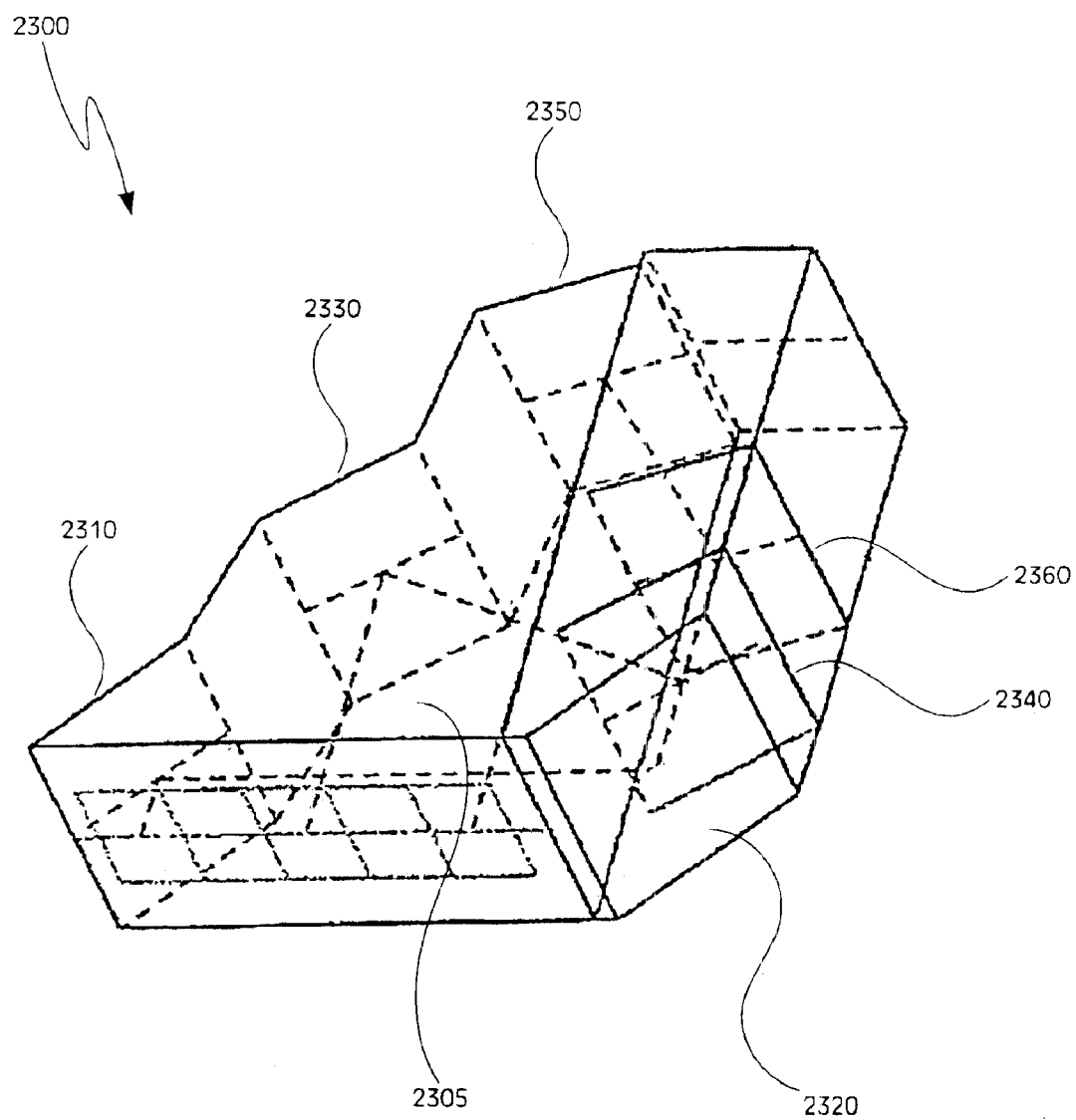
FIG. 23B shows a perspective view of the converger illustrated in FIG. 23A.
Figure 23C:
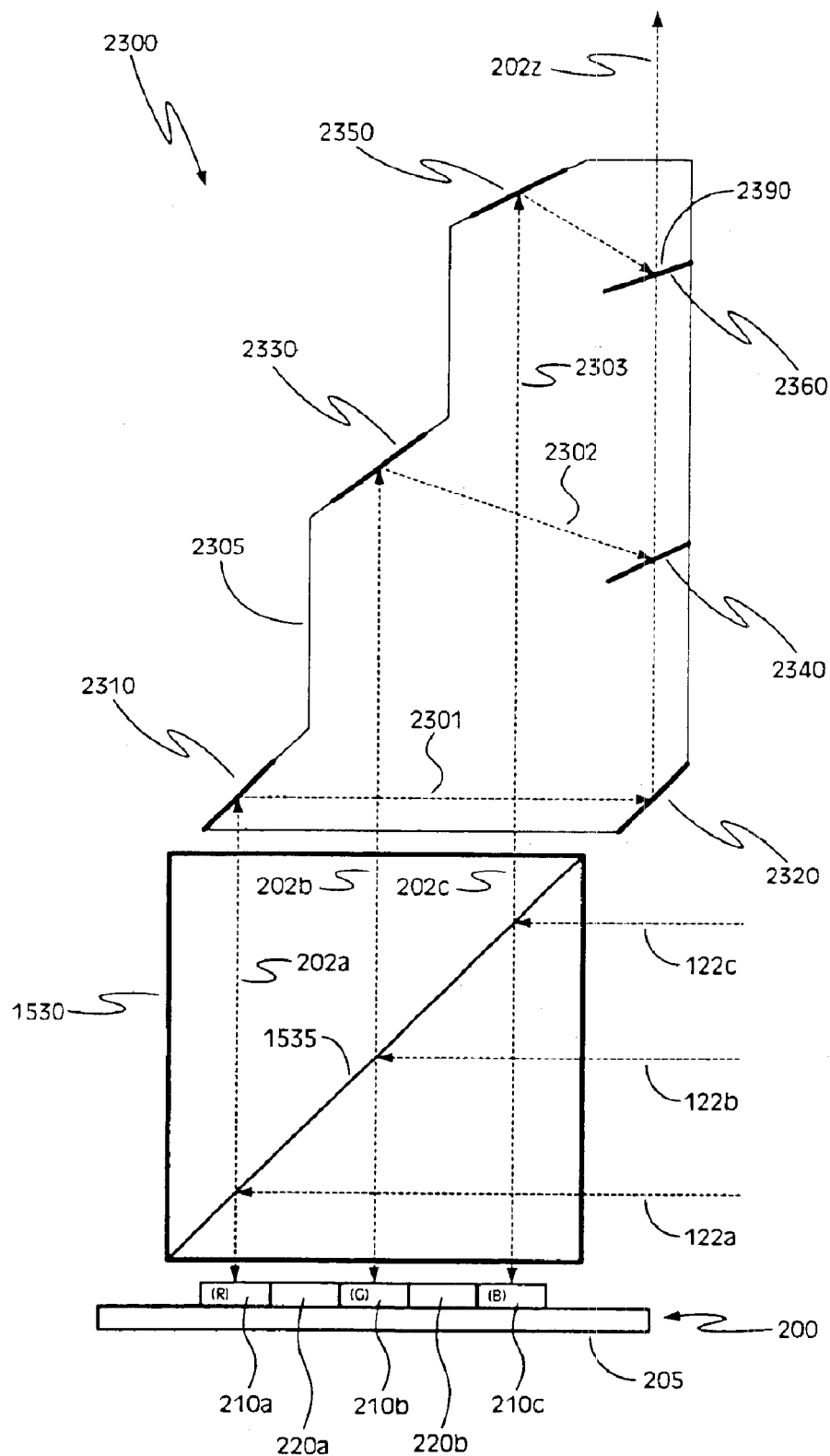
FIG. 23C is a side elevation view illustrating a further embodiment of the converger of FIG. 23A.

Illustrated in FIGS. 23A through 23C is another embodiment of a converger 2300. FIG. 23A illustrates an elevation view of the converger 2300 in combination with a multi-array SLM device 200, whereas FIG. 23B shows a perspective view of the converger 2300. FIG. 23C illustrates the converger 2300 in conjunction with a PBS 1530. It should be understood that the converger 130 shown in FIG. 1 (and FIGS. 3B and 3C) is not limited to the embodiment of the converger 2300 now described.

Referring to FIGS. 23A and 23B, the converger 2300 comprises a body 2305 (or housing or other suitable support structure) that is positioned and oriented to receive a set of images 202a, 202b, 202c from the multi-array SLM device 200, or other source of images. The multi-array SLM device 200 functions as set forth above and, although the multi-array SLM device 200 is shown in FIGS. 23A–B, it should be understood that the converger 2300 may be used with any of the embodiments of a multi-array SLM device described above.

The converger 2300 provides first optical path 2301 extending from an upstream component—which, in this instance, is the multi-array SLM device 200—and a point or plane of convergence 2390, which is described in more detail below. Similarly, the converger 2300 provides second and third optical paths 2302, 2303, each extending from the upstream component to the point or plane of convergence 2390. The first, second, and third images 202a, 202b, 202c generated by multi-array SLM device 200 are directed along the first, second, and third optical paths 2301, 2302, 2303, respectively. At the point or plane of convergence 2390, the three images 202a–c are combined into a single image 202z.

To insure the single, combined image 202z is in focus, the optical paths 2301, 2302, 2303 should be of substantially equal optical length. For the embodiment of a converger 2300 illustrated in FIGS. 23A–C, the optical paths 2301, 2302, 2303 also have a substantially equal physical length as well. In one embodiment, the first optical path 2301 includes a series of reflective elements 2310, 2320, each of the reflective elements comprising a mirror, a coated surface, or a surface oriented at an angle greater than a critical angle (i.e., to provide for total internal reflection, as described above). The image 202a from addressable array 210a arrives at the first reflective element 1210, and the first reflective element 2310 reflects the image 202a toward the second reflective element 2320. The image 202a is reflected from the second reflective element 2320 and is directed towards the point or plane of convergence 2390.

The second optical path 2302 includes a series of reflective elements, including a third reflective element 2330 and a fourth reflective element 2340. The third reflective element 2330 comprises a mirror, a coated surface, or a surface oriented at an angle greater than a critical angle (i.e., to provide for total internal reflection). The image 202b from addressable array 210b arrives at reflective element 2330, and the third reflective element 2330 reflects the image 202b toward the fourth reflective element 2340. The fourth reflective element 2340 comprises a dichroic mirror or similar device, and the dichroic mirror 2340 reflects the image 202b (i.e., the portion of the spectrum corresponding to the color of image 202b), and image 202b is directed toward the point or plane of convergence 2390. Dichroic mirror 2340 transmits the image 202a, such that image 202a (which is being reflected from reflective element 2320) may pass through to the point or plane of convergence 2390.

The third optical path 2303 also includes a number of reflective elements, including a fifth reflective element 2350 and a sixth reflective element 2360. Reflective element 2350 comprises a mirror, a coated surface, or a surface oriented at an angle greater than a critical angle (i.e., to provide for total internal reflection). The image 202c from addressable array 210c arrives at the fifth reflective element 2350, which reflects the image 202c toward the sixth reflective element 2360. Sixth reflective element 2360 comprises a dichroic mirror or similar device, and the dichroic mirror 2360 reflects the image 202c (i.e., the portion of the spectrum corresponding to the color of image 202c), and image 202c is directed toward the point or plane of convergence 2390. The image 202a, which passed through dichroic mirror 2340, is also transmitted by dichroic mirror 2360 to the point or plane of convergence 2390. Similarly, the image 202b, which has been reflected from dichroic mirror 2340, also passes through the dichroic mirror 2360 to the point or plane of convergence 2390.

Note that the point or plane of convergence 2390 is on the downstream side of dichroic mirror 2360. At this point, all three images 202a–c are merged into a single image. Further, all three images 202a–c have traversed an optical path—i.e., optical paths 2301, 2302, 2303, respectively—through the converger 2300 of substantially equal optical length and, therefore, the final converged image 202z will be in focus. An equal optical path length for all optical paths 2301, 2302, 2303 is provided by appropriate position and orientation of the reflective elements 2310, 2320, 2330, 2340, 2350, 2360. Generally, the images 202a–c arriving at converger 2300 originate from the same plane (e.g., the addressable arrays 210a–c may be formed or disposed on the same substrate); however, in other embodiments, as set forth above, one of the addressable arrays 210a–c may be vertically and/or angularly offset relative to another one of the addressable arrays. In another embodiment of converger 2300, the position and orientation of the reflective elements 2310, 2320, 2330, 2340, 2350, 2360 is selected to compensate for such vertical and/or angular offset of the addressable arrays of a multi-array SLM device, thereby providing an equal optical path length for all optical paths through the converger 2300.

The converger body 2305 may comprise a glass material, a polymer material (e.g., a clear plastic), quartz, or other suitable material. Further, the converger body 2305 may comprise a single piece of material having the reflective elements 2310, 2320, 2330, 2340, 2350, 2360 disposed thereon, or the converger body 2305 may comprise a number of parts that are assembled together along with the reflective elements 2310, 2320, 2330, 2340, 2350, 2360. It of course should be understood that at least some of the reflective elements may not comprise separate parts but, rather, are surfaces oriented at the appropriate angle to take advantage of the principle of total internal reflection. In another embodiment, each of the reflective elements 2310, 2320, 2330, 2340, 2350, 2360 comprises a separate part that is supported by a body 2305 (or other suitable structure) having an internal cavity, such that the space between these reflective elements (i.e., the space within which optical paths 2301, 2302, 2303 lie) is occupied by a gas (e.g., air) or, alternatively, is maintained at a vacuum.

It should be understood that, although only three optical paths 2301, 2302, 2303 are provided by converger 2300 for three images 202a–c, respectively, the converger 2300 may provide optical paths for and combine any suitable number of images (e.g., four images) into a single image. Also, the use of the reflective elements 2310, 2320, 2330, 2340, 2350, 2360 is but one embodiment of a converger capable of combining multiple images, and it should be understood that such a converger may utilize any suitable combination of reflective elements, as well as other optical components. It should be further understood that the reflective elements 2310, 2320, 2330, 2340, 2350, 2360 may not be of equal size, and in one embodiment the size of the reflective elements increases along the length of an optical path 2301, 2302, 2303 to compensate for divergence of the images 202a–c, respectively.

One or more optical elements may be disposed between the multi-array SLM device 200 and converger 2300 (e.g., a PBS or a TIR prism) to direct the incoming color light components onto the addressable arrays 210a–c of multi-array SLM device 200 and, further, to pass the generated images 202a–c to the converger 2300. Referring now to FIG. 23C, the converger 2300 is illustrated in combination with a PBS 1530. The PBS 1530 receives a number of color light components 122a–c (e.g., red, green, and blue), which may be received from a color generator (e.g., color separator 120 shown in FIG. 1). The color components 122a–c are reflected by internal plane 1535, and each of the color components 122a–c is directed to a corresponding one of the addressable arrays 210a–c of multi-array SLM device 200. The addressable arrays 210a–c generate images 202a–c, and the images 202a–c pass through the PBS 1530 and into converger 2300, which combines the images 202a–c into a single image 202z, as described above.

Figure 24:
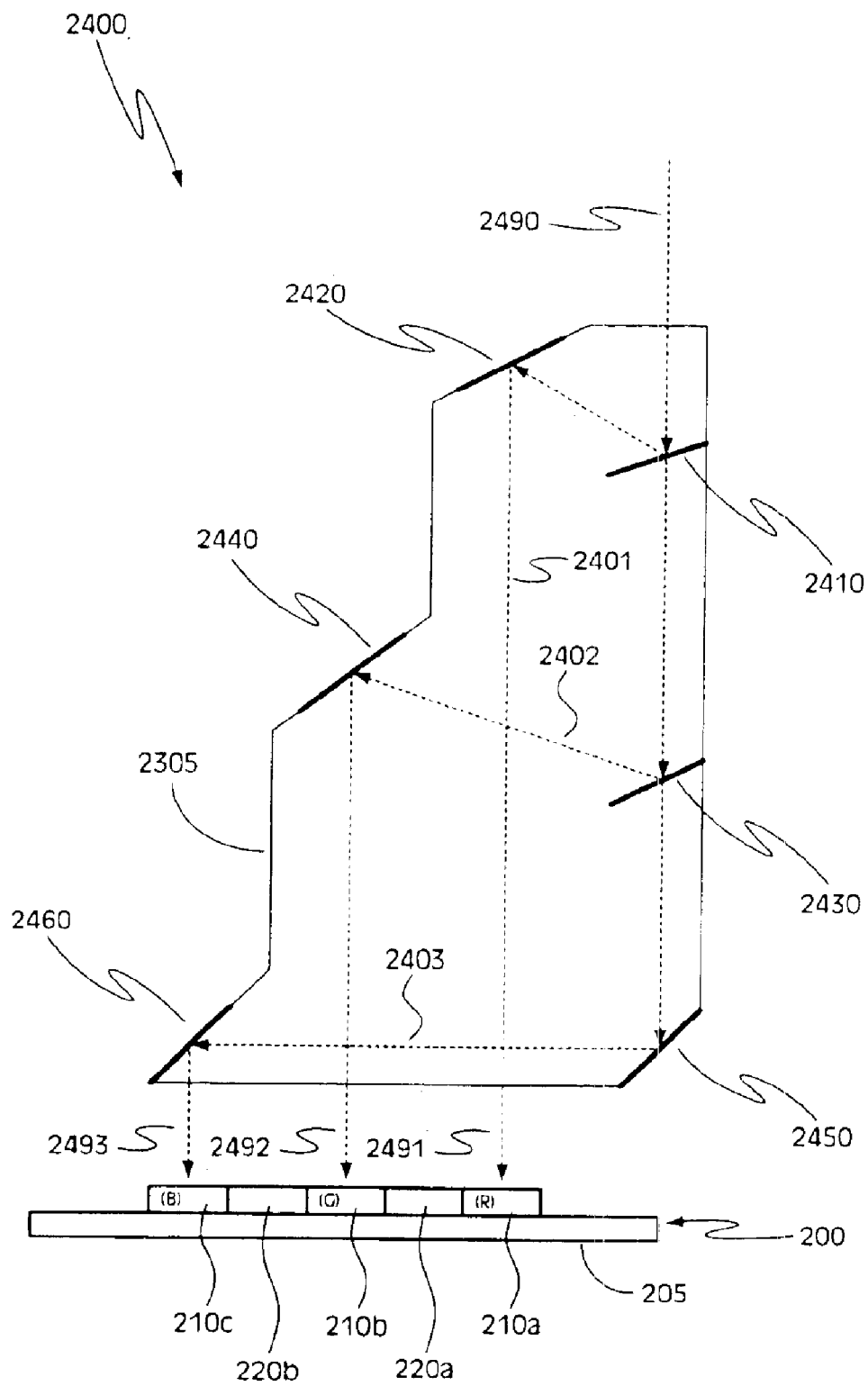
FIG. 24 is a side elevation view illustrating another embodiment of a color generator.

Illustrated in FIG. 24 is another embodiment of a color generator 2400. It should be understood that the color generator 120 shown in FIG. 1 (and FIGS. 3B and 3C) is not limited to the embodiment of the color generator 2400 now described. Further, it should be noted that the color generator 2400 may be the same or similar in construction to the converger 2300 described above.

Referring to FIG. 24, the color generator 2400 comprises a body 2405 (or housing or other suitable support structure) that is positioned and oriented to receive a light component 2490, wherein the light 2490 comprises "white" light or other polychromatic light. The color generator 2400 provides a first optical path 2401 extending from an upstream component—e.g., the source of light 2490, such as a lamp or other luminescent source, or other optical component(s)—to a downstream component, which in the illustrated embodiment is a multi-array SLM device 200. Color generator 2400 also provides a second optical path 2402 extending from the upstream component to the downstream component, and the color generator 2400 further provides a third optical path 2403 extending between the upstream and downstream components. The downstream component may comprise any other component, such as a PBS or TIR prism (e.g., to direct the color components produced by color generator 2400 onto the addressable arrays 210a–c of multi-array SLM device 200).

The light 2490 is received at a first reflective element 2410. The first reflective element 2410 comprises a dichroic mirror or similar device that reflects one color of light (i.e., a certain portion of the color spectrum) and passes other colors of light (i.e., the remaining portions of the color spectrum). For example, the first reflective element 2410 may reflect blue light and transmit red and green light. Thus, a first color of light (e.g., red) 2491 is reflected from the first reflective element and is directed along the first optical path 2401 to a second reflective element 2420. The second reflective element comprises any device capable of reflecting light, such as a mirror, a coated surface, or a surface oriented at an angle greater than a critical angle (to take advantage of the principle of total internal reflection). The second reflective element 2420 reflects the first light component 2491 and directs the first light component along the first optical path 2401 toward the downstream component (e.g., multi-array SLM device 200).

As previously noted, the first reflective element 2410 transmits all but the reflected portion of the color spectrum. Accordingly, the remaining colors of light are passed to a third reflective element 2430. The third reflective element 2430 also comprises a dichroic mirror or similar device that reflects a certain portion of the color spectrum (e.g., green) and transmits the remaining portions of the spectrum. Therefore, a second color of light (e.g., green) 2492 is reflected from the third reflective element 2430 and towards a fourth reflective element 2440. The fourth reflective element 2440 comprises any device capable of reflecting light, such as a mirror, a coated surface, or a surface oriented at an angle greater than a critical angle (i.e., for total internal reflection). The fourth reflective element 2440 reflects this second light component 2492 and directs the second light component along the second optical path 2402 toward the downstream component.

The third reflective element 2430 passes all but the reflected portion of the color spectrum, as noted above. Thus, a third color of light (e.g., blue) 2493 is transmitted through to a fifth reflective element 2450. The fifth reflective element 2450 comprises any device capable of reflecting light, such as a mirror, a coated surface, or a surface oriented at an angle greater than a critical angle. The fifth reflective element 2450 reflects the third color component 2493 and the third color component is directed along the third optical path to a sixth reflective element 2460. The sixth reflective element also comprises any device capable of reflecting light, such as a mirror, a coated surface, or a surface oriented at an angle greater than a critical angle. The sixth reflective element 2460 reflects the third color component 2493 and directs the third color component toward the downstream component.

Thus, the color generator 2400 receives a light input 2490 and separates this light into three color components 2491, 2492, 2492 (e.g., red, green, and blue). Also, all three color component 2491, 2492, 2493 have been propagated along an optical path—i.e., optical paths 2401, 2402, 2403, respectively—through color generator 2400 of substantially equal optical length. An equal optical path length for all optical paths 2401, 2402, 2403 is provided by appropriate position and orientation of the reflective elements 2410, 2420, 2430, 2440, 2450, 2460. The color generator 2400 provides equal optical path lengths between the first reflective element 2410 (or, alternatively, the light source) and the downstream component (e.g., multi-array SLM device 200). Note that, for the embodiment shown in FIG. 24, the optical paths 2401, 2402, 2403 have substantially equal physical lengths as well. Generally, the light components 2491, 2492, 2493 will be directed to points lying on the same plane—i.e., to addressable arrays 210*a*–*c* of multi-array device 200. However, in other embodiments, as previously set forth, one of the addressable arrays 210*a*–*c* may be vertically and/or angularly offset relative to another one of the addressable arrays. Therefore, in another embodiment of color generator 2400, the position and orientation of the reflective elements 2410, 2420, 2430, 2440, 2450, 2460 is selected to compensate for such vertical and/or angular offset, thereby providing an equal optical path length for all optical paths through color generator 2400.

The color generator body 2405 may comprise a glass material, a polymer material (e.g., a clear plastic), quartz, or other suitable material. Further, the color generator body 2405 may comprise a single piece of material having the reflective elements 2410, 2420, 2430, 2440, 2450, 2460 disposed thereon, or the color generator body 2405 may comprise a number of parts that are assembled together along with the reflective elements 2410, 2420, 2430, 2440, 2450, 2460. It of course should be understood that at least some of the reflective elements may not comprise separate parts but, rather, are surfaces oriented at the appropriate angle to take advantage of the principle of total internal reflection. In another embodiment, each of the reflective elements 2410, 2420, 2430, 2440, 2450, 2460 comprises a separate part that is supported by a body 2405 (or other suitable structure) having an internal cavity, such that the space between these reflective elements (i.e., the space within which optical paths 2401, 2402, 2403 lie) is occupied by a gas (e.g., air) or, alternatively, is maintained at a vacuum.

It should be understood that, although only three optical paths 2401, 2402, 2403 are provided by color generator 2400 for three color components 2491, 2492, 2493, respectively, the color generator 2400 may provide optical paths for and generate any suitable number of color components (e.g., four). Also, the use of the reflective elements 2410, 2420, 2430, 2440, 2450, 2460 is but one embodiment of a color generator capable of providing a number of color components, and it should be understood that such a color generator may utilize any suitable combination of reflective elements, as well as other optical components. It should be further understood that the reflective elements 2410, 2420, 2430, 2440, 2450, 2460 may not be of equal size, and in one embodiment the size of the reflective elements increases along the length of an optical path 2401, 2402, 2403 to compensate for divergence of the color components 2491, 2492, 2493, respectively.

Embodiments of a multi-array SLM device 200, 300, 400, 500, 600, 700, 800, 900, 1000, 1100—as well as embodiments of an optics engine 100, 1500, 2100, 2200 incorporating the same—having been herein described, those of ordinary skill in the art will appreciate the advantages thereof. A multi-array SLM device allows for greater system integration and reduced part count, thereby decreasing system complexity and reducing overall system cost. However, because each of a number of images is generated by a separate addressable array of elements, image quality is not sacrificed. Rather, image quality should equal that of current three-chip systems without the complexity of these conventional systems.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

What is claimed is:

1. A device comprising:
   a plurality of light modulating circuits disposed on a substrate, each of the circuits having an addressable array of elements disposed on the substrate, each of the addressable arrays of elements to modulate light; and
   a plurality of buffer regions disposed between neighboring addressable arrays of the plurality of light modulating circuits to buffer the neighboring addressable arrays to compensate for divergence of incoming light received at a light modulating circuit.

2. The device of claim 1, wherein each of the addressable arrays is capable of receiving one of a number of light components and modulating the one light component to generate an image.

3. The device of claim 1, wherein each of the addressable arrays is capable of emitting one of a number of colors of light and modulating the one color of light to generate an image.

4. The device of claim 1, further comprising circuitry disposed in the buffer regions.

5. The device of claim 4, wherein the circuitry comprises circuitry to control modulation of each of the addressable arrays of elements.

6. The device of claim 5, wherein the circuitry further comprises image generation circuitry to receive a video signal and generate image data.

7. The device of claim 1, wherein each of the addressable arrays is oriented at a forty-five degree angle on the substrate.

8. The device of claim 1, wherein the plurality of light modulating circuits comprises three addressable arrays of elements, and the plurality of buffer regions comprises two buffer regions.

9. The device of claim 1, wherein the plurality of light modulating circuits comprises four addressable arrays of elements, and the plurality of buffer regions comprises two buffer regions.

10. The device of claim 1, wherein one of the addressable arrays is angularly offset relative to another one of the addressable arrays.

11. The device of claim 1, wherein one of the addressable arrays is vertically offset relative to another one of the addressable arrays.

12. The device of claim 1, wherein each of the number of addressable arrays provides an aspect ratio of 4:3.

13. The device of claim 12, wherein each of the number of addressable arrays comprises an array of 800 by 600 elements, an array of 1,024 by 768 elements, an array of 1,600 by 1,200 elements, or an array of 2,048 by 1,536 elements.

14. The device of claim 1, wherein each of the number of addressable arrays provides an aspect ratio of 16:9.

15. The device of claim 14, wherein each of the number of addressable arrays comprises an array of 1,280 by 720 elements or an array of 1,920 by 1,080 elements.

16. The device of claim 1, wherein each of the number of addressable arrays provides an aspect ratio of 5:4.

17. The device of claim 16, wherein each of the number of addressable arrays comprises an array of 1,280 by 1,024 elements.

18. The device of claim 1, wherein each element of each addressable array of elements comprises a mirror.

19. The device of claim 1, wherein each element of each addressable array of elements comprises a liquid crystal element.

20. The device of claim 1, wherein each element of each addressable array comprises a light emitting diode element.

21. The device of claim 1, wherein the substrate comprises a semiconductor material.

22. The device of claim 1, wherein the substrate comprises one of a glass material, a polymer material, or quartz.

23. A method comprising:
forming a plurality of light modulating circuits on a substrate, each of the circuits having an addressable array of elements, each of the addressable arrays of elements to modulate light; and
providing a plurality of buffer regions disposed between neighboring addressable arrays of the plurality of light modulating circuits to buffer the neighboring addressable arrays to compensate for divergence of incoming light received at a light modulating circuit.

24. The method of claim 23, wherein each of the number of addressable arrays is capable of receiving one of a number of light components and modulating the one light component to generate an image.

25. The device of claim 23, wherein each of the number of addressable arrays is capable of emitting one of a number of colors of light and modulating the one color of light to generate an image.

26. The method of claim 23, further comprising forming circuitry in the buffer regions.

27. The method of claim 26, wherein the circuitry comprises control circuitry to modulate each of the addressable arrays of elements.

28. The method of claim 27, wherein the circuitry further comprises image generation circuitry to receive a video signal and generate image data.

29. The method of claim 23, further comprising orienting each of the number of addressable arrays at a forty-five degree angle on the substrate.

30. The method of claim 23, wherein the plurality of light modulating circuits comprises three addressable arrays of elements, and the plurality of buffer regions comprises two buffer regions.

31. The method of claim 23, wherein the plurality of light modulating circuits comprises four addressable arrays of elements, and the plurality of buffer regions comprises three buffer regions.

32. The method of claim 23, further comprising angularly offsetting one of the addressable arrays relative to another one of the addressable arrays.

33. The method of claim 23, further comprising vertically offsetting one of the addressable arrays relative to another one of the addressable arrays.

34. The method of claim 23, wherein forming one of the number of addressable arrays of elements comprises forming an addressable array of mirrors.

35. The method of claim 23, wherein forming one of the number of addressable arrays of elements comprises forming an addressable array of liquid crystal elements.

36. The method of claim 23, wherein forming one of the number of addressable arrays of elements comprises forming an addressable array of light emitting diode elements.

37. The method of claim 23, wherein the substrate comprises a semiconductor material.

38. The method of claim 23, wherein the substrate comprises one of a glass material, a polymer material, or quartz.

* * * * *